United States Patent
Takahashi et al.

(10) Patent No.: US 9,417,511 B2
(45) Date of Patent: Aug. 16, 2016

(54) LIGHTING DEVICE, PROJECTOR INCLUDING THE SAME, AND LIGHTING METHOD

(71) Applicants: Tatsuya Takahashi, Tokyo (JP); Kazuhiro Fujita, Tokyo (JP); Issei Abe, Kanagawa (JP)

(72) Inventors: Tatsuya Takahashi, Tokyo (JP); Kazuhiro Fujita, Tokyo (JP); Issei Abe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 146 days.

(21) Appl. No.: 14/277,196

(22) Filed: May 14, 2014

(65) Prior Publication Data

US 2014/0340649 A1 Nov. 20, 2014

(30) Foreign Application Priority Data

May 14, 2013 (JP) .................. 2013-102195

(51) Int. Cl.
G02B 27/10 (2006.01)
G03B 21/20 (2006.01)
G03B 33/04 (2006.01)
G03B 33/08 (2006.01)
H04N 9/31 (2006.01)

(52) U.S. Cl.
CPC .......... *G03B 21/204* (2013.01); *G02B 27/1006* (2013.01); *G03B 33/04* (2013.01); *G03B 33/08* (2013.01); *H04N 9/3114* (2013.01); *H04N 9/3164* (2013.01)

(58) Field of Classification Search
CPC .... G03B 21/14; G03B 21/208; G03B 21/204; G03B 21/2013; G02B 27/102; G02B 27/48; H04N 9/31; H04N 9/31111; H04N 9/3114; H04N 9/3117; H04N 9/3164
See application file for complete search history.

(56) References Cited

U.S. PATENT DOCUMENTS

| | | | | |
|---|---|---|---|---|
| 6,252,636 B1* | 6/2001 | Bartlett | ................ | H04N 9/3164 348/743 |
| 8,403,493 B2* | 3/2013 | Ogawa | ................... | G03B 33/08 345/32 |
| 8,496,333 B2* | 7/2013 | Wang | ................. | G02B 26/0833 353/84 |
| 8,545,032 B2* | 10/2013 | Chen | ..................... | G03B 21/20 362/260 |
| 8,678,596 B2* | 3/2014 | Sakata | ................... | G02B 7/008 313/506 |
| 8,833,946 B2* | 9/2014 | Chen | .................... | H04N 9/3161 353/84 |
| 8,979,278 B2* | 3/2015 | Narikawa | ............. | G03B 21/204 353/85 |

(Continued)

FOREIGN PATENT DOCUMENTS

| | | |
|---|---|---|
| JP | 2011-191602 | 9/2011 |
| JP | 2012-048041 | 3/2012 |

(Continued)

*Primary Examiner* — William C Dowling
(74) *Attorney, Agent, or Firm* — Harness, Dickey & Pierce

(57) ABSTRACT

A lighting device includes a first light source which emits excitation light, a wavelength convertor which generates fluorescence containing at least a first wavelength range and a second wavelength range by excitation with the excitation light, a second light source which emits light containing a third wavelength range different from the first wavelength range and the second wavelength range, an optical path-combining element which combines an optical path for the fluorescence from the wavelength convertor and an optical path for the light from the second light source, so as to guide the combined optical paths to a single emission optical path, and a light separator disposed in the emission optical path, which obtains and emits at least the first wavelength range and the second wavelength range of the fluorescence and at least the third wavelength range of the light from the second light source.

14 Claims, 8 Drawing Sheets

(56) References Cited

U.S. PATENT DOCUMENTS

| | | |
|---|---|---|
| 2012/0050693 A1 | 3/2012 | Yanai |
| 2012/0242912 A1 | 9/2012 | Kitano |
| 2013/0088689 A1* | 4/2013 | Lin ...................... G03B 21/204 353/31 |
| 2014/0028984 A1* | 1/2014 | Osaka ................ G03B 21/2013 353/31 |

FOREIGN PATENT DOCUMENTS

| | | |
|---|---|---|
| JP | 2012-048130 | 3/2012 |
| JP | 2012-093454 | 5/2012 |
| JP | 2012-212129 | 11/2012 |

* cited by examiner

LIGHTING DEVICE, PROJECTOR INCLUDING THE SAME, AND LIGHTING METHOD

PRIORITY CLAIM

The present application is based on and claims priority from Japanese Patent Application No. 2013-102195, filed on May 14, 2013, the disclosure of which is hereby incorporated by reference in its entirety.

BACKGROUND

1. Field of the Invention

The present invention relates to a lighting device, a projector including the lighting device, and a lighting method.

2. Description of the Related Art

In recent years, large-screen displays have become widespread. Large-screen displays are commonly used in conferences, presentations, training seminars, or the like. Such large-screen displays include various types of displays such as a liquid crystal display or a plasma display, and an appropriate display is selected among these in accordance with a range of a location or the number of participants. A display which can project an image on a projection surface such as a screen so as to display an enlarged image, namely, a projector, is selected among the various types of displays. This projector is the most widespread large-screen display because it is relatively inexpensive, and has a good portability (namely, a compact, lightweight, and portable projector).

Within such a background, situations which require communication are increasing nowadays. For example, many small conference rooms or partitioned meeting spaces are provided in an office, and conferences or meetings using a projector are often conducted.

As a lighting device for use in such a projector, a projector using a high brightness discharge lamp (for example, extra-high-pressure mercury lamp) as a light source is known. This discharge lamp requires time until stable emission after the start of lighting while achieving high brightness at low cost. For this reason, as a substitute light source for the discharge lamp, a light-emitting element such as red (R), green (G), and blue (B) light-emitting diodes (LED) or an organic EL element has been proposed, and is put into a practical use.

As a lighting device using such a light-emitting element, a lighting device is known which irradiates a fluorescent body with excitation light from an excitation light source (first light source) and generates red (R), green (G), and yellow (Y) light from the fluorescent body (refer to Patent Document 1, JP 2011-191602A). The lighting device described in Patent Document 1 uses a blue laser diode or the like as the excitation light source (first light source), and irradiates the fluorescent body with the blue excitation light from the excitation light source, so as to excite the fluorescent body, so that red (R), green (G), and yellow (Y) fluorescence is obtained. The light of red (R) and green (G) wavelength ranges is obtained by a color wheel on a time-division basis from the fluorescence of red (R), green (G), and yellow (Y) wavelength ranges, and emit from an emission optical path.

In the lighting device described in Patent Document 1, for example, a blue laser diode light source (second light source), which is provided separately from the excitation light source, emits blue (B) light, and this blue light joins the emission optical path for red and blue light after passing through the color wheel by an optical member (color composite prism). The lighting device sequentially emits the red, green, and blue light on a time-division basis. In the projector using such a lighting device, the red, green, and blue light sequentially emitted from the lighting device is directed to a light modulator, and the light is gradation-controlled with respect to each pixel by the light modulator, so that a color projection image is formed.

In the above-described lighting device, the red and green light passes through the color wheel, so that the lighting device can emit the red and green light of a desired tone and color purity. However, the blue light from the second light source directly joins the emission optical path without passing through the color wheel. For this reason, the blue light of a desired tone and color purity cannot be obtained. The color purity of the blue light cannot be improved. Thus, the reproduction of an accurate color image is limited.

SUMMARY

It is, therefore, an object of the present invention to provide a lighting device which can emit high color purity light, a projector including the lighting device, and a lighting method.

To attain the above object, one embodiment of the present invention provides a lighting device, including: a first light source which emits excitation light; a wavelength convertor which generates fluorescence containing at least a first wavelength range and a second wavelength range by excitation with the excitation light; a second light source which emits light containing a third wavelength range different from the first wavelength range and the second wavelength range; an optical path-combining element which combines an optical path for the fluorescence from the wavelength convertor and an optical path for the light from the second light source, so as to guide the combined optical paths to a single emission optical path; and a light separator disposed in the emission optical path, which obtains and emits at least the first wavelength range and the second wavelength range of the fluorescence and at least the third wavelength range of the light from the second light source on a time-division basis, wherein the wavelength convertor includes a region which generates the fluorescence by irradiation of the excitation light, and all of the region forms a reflection optical path which reflects the fluorescence toward the optical path-combining element.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Hereinafter, embodiments of the present invention will be described with reference to the drawings.

(Embodiment 1)

Figure 1:
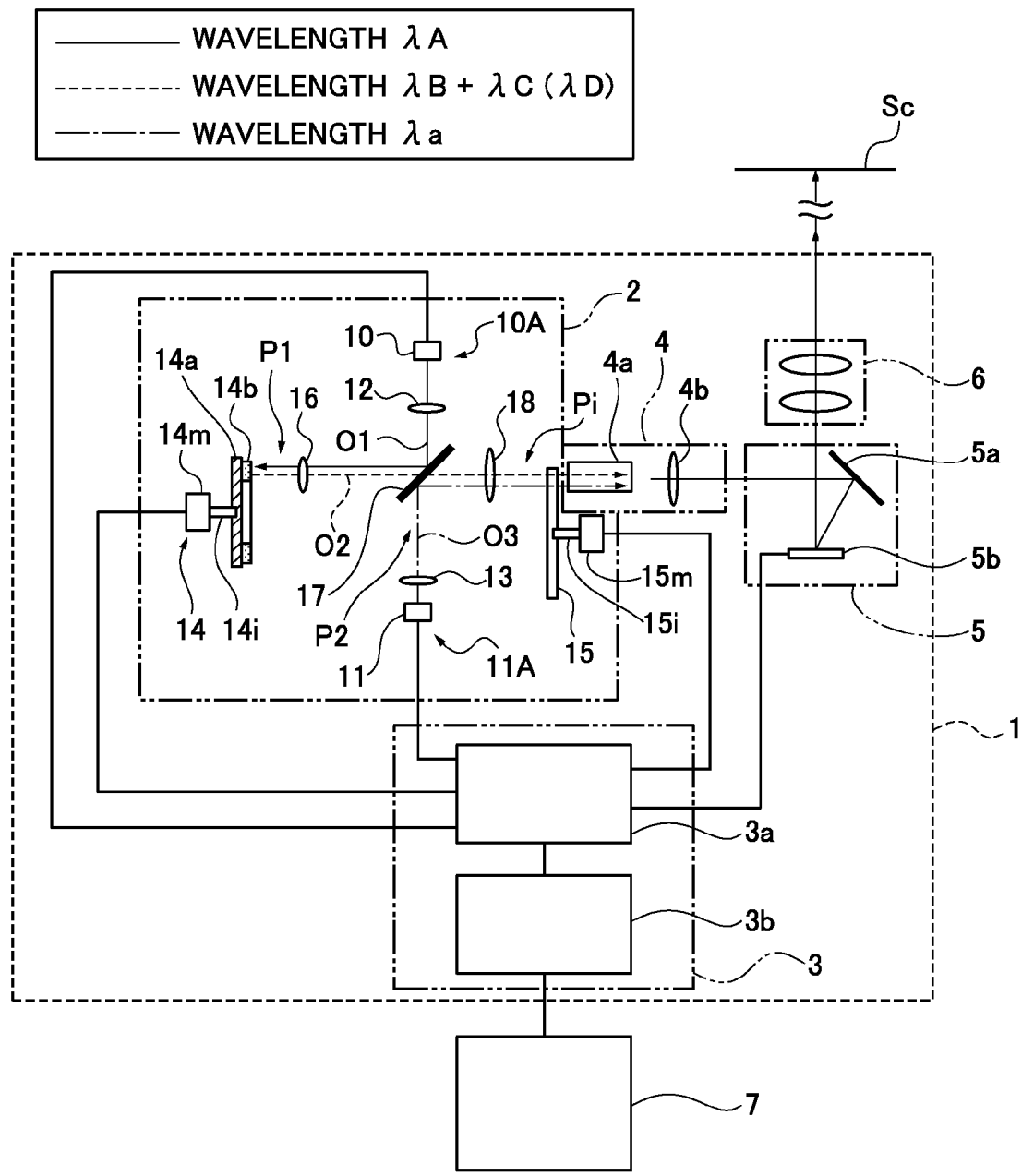
FIG. 1 is an optical view illustrating a projector including a lighting device according to Embodiment 1 of the present invention.

FIG. 1 is an optical view illustrating a lighting device and a projector including the light device according to Embodiment 1 of the present invention. As illustrated in FIG. 1, a projector 1 according to Embodiment 1 includes a lighting device 2, a controller 3, a light-guiding optical system 4, an image generator 5, and a projection optical system 6. The projector 1 is configured to project an image on a screen Sc such as a projection surface, so as to display an enlarged image.

[Lighting Device 2]

The lighting device 2 sequentially emits red light, green light, and blue light on a time-division base, or combines (mix) these so as to emit the combined light. The lighting device 2 emits light (light flux) of each color toward the after-described light tunnel 4a of the light-guiding optical system 4. The details of the configuration of the lighting device 2 will be described later.

[Light-Guiding Optical System 4]

The light-guiding optical system 4 guides light from the lighting device 2 to the image generator 5. The light-guiding optical system 4 includes a light tunnel 4a and a light-condensing element 4b. The light from the lighting device 2 is incident on the light tunnel 4a, and the light tunnel 4a has a hollow tubular shape and a mirror in an inner surface thereof. The light tunnel 4a equalizes a brightness distribution of incident light, namely, equalizes the light volume of the incident light by the repetition of light reflection inside thereof. The light-condensing element 4b appropriately condenses light (light flux) whose brightness distribution is equalized through the light tunnel 4a, and guides the light to the after-described reflection mirror (irradiated portion) 5a of the image generator 5.

[Image Generator 5]

The image generator 5 forms a full-color image based on image generation data by using the light guided by the light-guiding optical system 4. The image generator 5 includes a reflection mirror 5a and a light modulator 5b (portion to be irradiated). The reflection mirror 5a reflects the light guided by the light-guiding optical system 4 toward the light modulator 5b, so that the reflected light travels toward the light modulator 5b.

The light modulator 5b is connected to the after-described image-processing controller 3a of a controller 3, and is controlled by the image-processing controller 3a. The light modulator 5a forms a color projection image by gradation-controlling the light of each color emitted from the lighting device 2 and guided by the light-guiding optical system 4 with respect to each pixel. The light modulator 5b is a DMD (Digital Micromirror Device) in Embodiment 1. The light modulator 5b made of the DMD includes pixel-wise micromirrors, and can maintain each micromirror at one of different two angles under the control of the image-processing controller 3a (namely, binary control). More specifically, each micromirror of the light modulator 5a is maintained at an angle (ON state) which reflects each color light guided by the light-guiding optical system 4 toward the projection optical system 6 or an angle (OFF state) which reflects each color light toward an inside absorber without emitting each color light outside. In the light modulator 5b, each micromirror therefore separately drives (binary control). With this configuration, light which is projected with respect to a displaying pixel can be controlled. In the light modulator 5b, the gradation with respect to each displaying pixel can be expressed by adjusting the time ratio of the ON time of each micromirror based on a pulse width modulation method (PWM method).

In addition, in Embodiment 1 and the subsequent embodiments, DMD is used as the light modulator 5b. However, the present invention is not limited thereto. For example, a liquid crystal can be used as long as it forms a color projection image by using light of each color emitted from the lighting device 2 and guided by the light-guiding optical system 4.

[Projection Optical System 6]

The projection optical system 6 projects a projection image generated by the light modulator 5b of the image generator 5 on the screen Sc. The projection optical system 6 includes a fixed lens group provided in a fixed lens barrel and a movable lens group provided in a movable lens barrel. By moving the movable lens group, the focusing and zooming can be adjusted.

[Controller 3]

The controller 3 controls the entire operation of the projector 1, and includes an image-processing controller 3a and an interface 3b. The hardware of the controller 3 includes a CPU (Central Processing Unit), ROM (Read-Only Memory), and RAM (Random Access Memory). The image-processing controller 3a of the controller 3 controls each section of the projector 1 as described below by using RAM as a work memory in accordance with a program stored in ROM.

The image-processing controller 3a is connected to a first light source (excitation light source) 10, a second light source 11, a driver 14m of a fluorescent body wheel 14, and a driver 15m of a light transmission control wheel 15 in the lighting device 2, the light modulator 5b in the image generator 5, and a not-shown driver of the movable lens group in the projection optical system 6. The image-processing controller 3a thereby executes an emission control process of each color light in the lighting device 2, the generation control process of the projection image in the light modulator 5b of the image generator 5, and the adjustment control process of focus adjustment and zoom adjustment in the projection optical system 6.

The controller 3 includes an interface 3b relative to an external information device. The image-processing controller 3a can load image data or the like from the external information device of a personal computer 7 or the like through the interface 3b. The image-processing controller 3a executes an appropriate image process to the loaded image data, and generates image generation data suitable for generating a projection image in the light modulator 5b of the image generator 5. Next, the image-processing controller 3a generates a driving signal which drives the image generator 5 based on the image generation data, and outputs the driving signal to the image generator 5. In this case, the controller 3 generates an emission control signal of the lighting device 2 in synchronization with the driving signal of the image generator 5, and outputs the emission control signal to the lighting device 2.

As described below, the image-processing controller 3a controls the lighting device 2 by an emission control signal, and controls the image generator 5 by a driving signal. In other words, the image-processing controller 3a sequentially switches light of a red (R) wavelength range (wavelength $\lambda B$), light of a green (G) wavelength range (wavelength $\lambda C$), and light of a blue (B) wavelength range (wavelength $\lambda a$) on a time-division basis, so that the lighting device 2 emits the light. The image-processing controller 3a separately drives each micromirror of the light modulator 5b in the image generator 5 in synchronization with the emission timing of each color light emitted from the lighting device 2. With this control, in the projector 1, a projection image of each color based on image generation data sequentially projects on the screen Sc illustrated in FIG. 1. In the projector 1, a full-color image based on the image generation data is generated on the screen Sc by using a residual image phenomenon of the eyes.

[Detail of Lighting Device 2]

Figure 2:
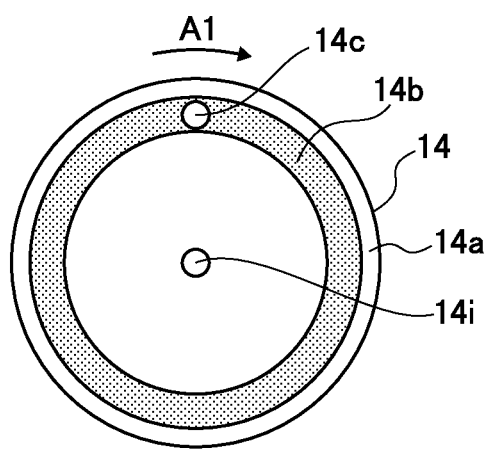
FIG. 2 is a plan view illustrating an enlarged fluorescent body wheel (wavelength convertor) illustrated in FIG. 1.
Figure 3:
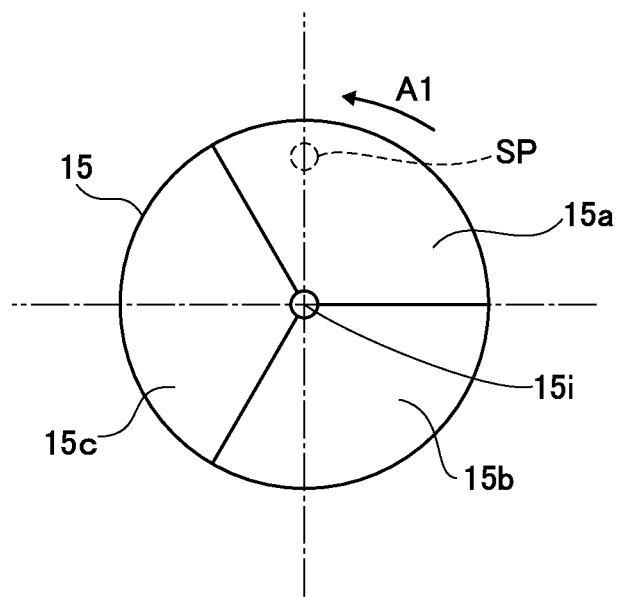
FIG. 3 is a plan view illustrating an enlarged light transmission control wheel (light separator) illustrated in FIG. 1.

Next, the configuration of the lighting device 2 as one example of the lighting device according to the present invention will be described with reference to FIGS. 1-3. FIG. 2 is a plan view illustrating the enlarged fluorescent body wheel 14 for use in the lighting device 2, and is a view as seen from the excitation light-incident side. FIG. 3 is a plan view illustrating an enlarged light transmission control wheel 15, and is a view as seen from the fluorescence incident side. In FIG. 1, for the sake of simplification of the description, a plurality of optical axes (first optical axis O1, second optical axis O2, and third optical axis O3) through which a plurality of light of different wavelength ranges ($\lambda A$, $\lambda B$, $\lambda C$, $\lambda D$, and $\lambda a$) passes is illustrated to be shifted to each other from a dichroic mirror 17 to the fluorescent body wheel 14 through the second condensing lens 18, and from the dichroic mirror 17 to the light tunnel 4a through the second condensing lens 18, and the light transmission control wheel 15.

The lighting device 2 in Embodiment 1 sequentially emits the light of red (R) wavelength range (wavelength $\lambda B$), the light of green (G) wavelength range (wavelength $\lambda C$), and the light of blue (B) wavelength range (wavelength $\lambda a$) on a time-division basis toward the light tunnel 4a from a single emission optical path Pi. The lighting device 2 includes two light sources such as a first light source (excitation light source) 10 and a second light source 11, as illustrated in FIG. 1.

The first light source (excitation light source) 10 is a light-emitting element which emits the light of blue wavelength range ($\lambda A$) as excitation light. The first light source (excitation light source) 10 uses a blue laser diode (semiconductor laser, LD) which generates blue laser light as visible light, and emits the light (beam) of wavelength ($\lambda A$) (400 nm<$\lambda A$<450 nm). Only one LD is schematically illustrated in FIG. 1 as the first light source (excitation light source) 10 for simplifying the description. In Embodiment 1, the first light source 10 includes a light-emitting array made of a plurality of blue laser diodes. The first light source (excitation light source) 10 operates as an excitation light source which generates fluorescence (fluorescence of wavelength $\lambda D$ containing wavelength $\lambda B$ and wavelength $\lambda C$) by the fluorescent body 14b of the fluorescent body wheel 14.

LD includes a polarization property, so that LD can improve the reflection rate by the dichroic mirror 17 by appropriately selecting the polarization direction. Namely, by providing S polarized excitation light relative to the dichroic mirror 17 by using the LD for the first light source 10 as the excitation light source, the reflection rate of the excitation light with the dichroic mirror 17 can be improved. As a result, the excitation light is effectively irradiated to the fluorescent body wheel 14, and the generation efficiency of the fluorescence from the fluorescent body wheel 14 can be improved, so that the highly effective lighting device 2 can be realized.

The second light source 11 is a light-emitting element which emits light of a wavelength (wavelength $\lambda a$) different from the wavelength $\lambda B$ and the wavelength $\lambda C$. In Embodiment 1, a light-emitting diode (LED) which emits blue light as visible light is used as the second light source 11, and emits light (light flux) having 450 nm in a central light emission wavelength containing the wavelength $\lambda a$ (third wavelength range; 450 nm to 500 nm).

In addition, a light-emitting diode (LED) which generates blue light or a laser diode (LD) which generates a wavelength range in an ultraviolet region, or a combination light source of these can be used instead of a blue laser diode as the first light source (excitation light source) 10. A blue laser diode can be used instead of the light-emitting diode as the second light source 11. When using the blue laser diode, similar to the first light source (excitation light source) 10, the second light source 11 can be made of a single blue laser diode, or can be made of a plurality of blue laser diodes.

The lighting device 2 in Embodiment 1 includes two light sources as described above, and includes a first illumination optical system 10A which emits fluorescence by using the first light source (excitation light source) 10 and a second illumination optical system 11A which emits light by using the second light source 11. In this case, the optical path in the first illumination optical system 10A is set as a first optical path P1 and the optical path in the second illumination optical system 11A is set as a second optical path P2. The first optical path P1 and the second optical path P2 are combined as a single emission optical path Pi by the dichroic mirror 17 as an optical path-combining element. This emission optical path Pi is an optical path in which the fluorescence that has passed through the dichroic mirror 17 or reflected by the dichroic mirror 17 toward the light-guiding optical system 4 and the light from the second light source 11 travel, and an optical path from the dichroic mirror 17 to a not-shown emission port of the emission light.

The first lighting optical system 10A using the first light source (excitation light source) 10 includes the first light source (excitation light source) 10, a first collimator lens 12, the dichroic mirror 17 as the optical path-combining element, a first condensing lens 16, the fluorescent body wheel 14 as a wavelength convertor, the second condensing lens 18, and the light transmission control wheel 15 as a light separator. Referring to FIG. 1, O1 denotes an optical axis (first optical axis) of the blue light (excitation light) of the wavelength $\lambda a$ emitted from the first light source (excitation light source) 10, and O2 denotes an optical axis (second optical axis) of the fluorescence (yellow fluorescence) of the wavelength λD containing the wavelength λB (first wavelength range) and the wavelength λC (second wavelength range) generated from the fluorescent body wheel 14.

As illustrated in FIG. 1, the second lighting optical system 11A using the second light source 11 includes the second light source 11, a second collimator lens 13, the dichroic mirror 17, the second condensing lens 18, and the light transmission control wheel 15. O3 illustrated in FIG. 3 denotes an optical axis (third optical axis) of the blue light containing the wavelength λa (third wavelength range) emitted from the second light source 11.

The lighting of the first light source (excitation light source) 10 and the second light source 11 is controlled by the controller 3 in accordance with each color light from the lighting device 2. Namely, in Embodiment 1, the second light source 11 is turned off (OFF) while the first light source (excitation light source) 10 is lighting (ON), and the first light source 10 is turned off (OFF) while the second light source 11 is lighting (ON). The blue light of the wavelength λA from the first light source (excitation light source) 10 and the blue light containing the wavelength λa from the second light source 11 are therefore prevented from being mixed in the emission optical path Pi.

In Embodiment 1, the first light source (excitation light source) 10 and the second light source 11 are arranged such that the blue light (excitation light) of the wavelength λA from the first light source (excitation light source) and the blue light containing the wavelength λa from the second light source are incident on the dichroic mirror 17 from different directions to each other. Namely, when the light from the first lighting optical system 10A (blue light of wavelength λA and fluorescence of wavelength λD) enters from one surface (front surface) of the dichroic mirror 17, the light from the second lighting optical system 11 (blue light of wavelength λa) enters from the surface (back surface) opposite to that surface. The dichroic mirror 17 has an optical property which reflects the blue light of the wavelength λA and the blue light containing the wavelength λa. Thus, the blue light (excitation light) of the wavelength λA from the first lighting optical system 10A and the blue light of the wavelength λa from the second lighting optical system 11A are reflected in opposite directions to each other on the second optical axis O2. Therefore, even if the wavelength λA of the excitation light contains the wavelength λa or a part of the wavelength λa, the light of the wavelength λa or the light of a part of the wavelength λa derived from the excitation light is prevented from being mixed with the blue light of the wavelength λa of the second light source 11.

Hereinafter, each component of the first lighting optical system 10A will be described. The first collimator lens 12 of the first lighting optical system 10A condenses light (light flux) diffusing the wavelength λA from the first light source (excitation light source) 10, and obtains the condensed light as an approximate parallel light flux. The first collimator lens 12 emits the blue light (excitation light) of the wavelength λA as an approximate parallel light flux toward the dichroic mirror 17.

The dichroic mirror 17 reflects the blue light of the wavelength λA from the first light source (excitation light source) 10 and the blue light of the wavelength λa from the second light source 11, and has an optical property which transmits the yellow fluorescence of the wavelength λD generated from the fluorescent body wheel 14. The dichroic mirror 17 is disposed to be inclined at about 45 degrees relative to the second optical axis O2, which is the optical axis of the yellow fluorescence of the wavelength λD, and the first optical axis O1 which is the optical axis of the blue light of the wavelength λA. The dichroic mirror 17 reflects most of the blue light (excitation light) of the wavelength λA on the first optical axis O1 in the direction toward the fluorescent body wheel 14 which is an approximate 90-degree direction relative to the optical axis O1. The dichroic mirror 17 transmits the fluorescence of the wavelength λD on the second optical axis O2 toward the light transmission control wheel 15, and guides the fluorescence to the emission optical path Pi.

The dichroic mirror 17 transmits the fluorescence emitted from the first lighting optical system 10A, and guides the fluorescence to the emission optical path Pi. The dichroic mirror 17 also reflects the blue light containing the wavelength λa emitted from the second lighting optical system 11A such that the reflected blue light is combined with the emission optical path Pi. The dichroic mirror 17 combines the optical path (first optical path P1) of the emission light from the first lighting optical system 10A and the optical path (second optical path P2) of the emission light from the second lighting optical system 11A, so as to operate as the optical path-combining element toward the single emission optical path Pi.

The first condensing lens 16 and the fluorescent body wheel 14 are provided in the traveling direction of the blue light (excitation light) of the wavelength λA reflected by the dichroic mirror 17, i.e., in the reflection optical path of the blue light (excitation light). The first condensing lens 16 includes at least one lens, and is arranged between the dichroic mirror 17 and the fluorescent body wheel 14. The first condensing lens 16 condenses the blue light (excitation light) of the wavelength λA, which is reflected by the dichroic mirror 17 and travels in the reflection optical path of the first lighting optical system 10A, on a minute region 14c (refer to FIG. 2) of a fluorescent body 14b of the fluorescent body wheel 14. The first condensing lens 16 condenses the fluorescence (light flux) generated from the minute region 14c of the fluorescent body 14b, such that the condensed fluorescence is incident on the dichroic mirror 17.

The fluorescent body wheel 14 includes a circular base plate 14a and the fluorescent body 14b provided on the surface of the circular base plate 14a as illustrated in FIGS. 1, 2. The entire area provided with the fluorescent body 14b is made of a reflection member having an optical property which totally reflects the fluorescence of the wavelength λD emitted from the fluorescent body 14b. More specifically, the area provided with the fluorescent body 14b in the circular base plate 14a constitutes the reflection optical path of the fluorescence. As described above, by forming the circular base plate 14a with the reflection member including an optical property which totally reflects the fluorescence, the fluorescence generated from the fluorescent body 14b in the 360-degree direction can be effectively emitted toward the dichroic mirror 17. In addition, the area of the circular base plate 14a, which is provided with the fluorescent body 14b, can be only made of the reflection member, or the entire circular base plate 14a can be made of the reflection member.

The fluorescent body 14b is formed in a circular shape (ring shape) having the central axis line (rotation axis 14i) of the circular base plate 14a, as a center, and is provided in the circular base plate 14a. The fluorescent body 14b is excited by the blue light (excitation light) of the wavelength λA emitted from the first light source (excitation light source) 10, and is made of a material (fluorescent material) which generates the fluorescence containing at least the red light of the wavelength λB (first wavelength range) and the green light of the wavelength λC (second wavelength range). The fluorescent material is not specifically limited. However, it is preferable to use yellow fluorescence of YAG group which emits the yellow light containing the green light and the red light. In Embodiment 1, as the fluorescent body 14b, a fluorescent material is used which generates the yellow fluorescence of the wavelength λD (450 nm<λD<750 nm) containing the green light of the wavelength λC (450 nm<λB<600 nm) and the red light of the wavelength λB (580 nm<λC<750 nm). The yellow fluorescence (yellow light) of the wavelength λD containing the red light of the wavelength λB and the green light of the wavelength λC is therefore generated from the fluorescent body 14b.

As illustrated in FIG. 1, in the fluorescent body wheel 14, the circular base plate 14a is attached to a rotation axis 14i of a driver 14m such as an electric motor. The driver 14m is controlled by the controller 3. Upon the driving of the driver 14m, the fluorescent body wheel 14 rotates about the rotation axis 14i. The fluorescent body wheel 14 is provided such that the fluorescent body 14b always exists in a position (minute region 14c in FIG. 2) on which the blue light (excitation light) of the wavelength λA condensed by the first condensing lens 16 is incident regardless of the rotation about the rotation axis 14i.

As illustrated in FIG. 2, the light of the wavelength λA through the first condensing lens 16 is irradiated on the minute region 14c of the fluorescent body 14b of the fluorescent body wheel 14 as a small spot. If the irradiation position of the light as the small spot is gathered in one position of the fluorescent body 14b, and the one position is irradiated, the generation efficiency of the fluorescence may be decreased or the emission property may be deteriorated. On the other hand, the fluorescent body wheel 14 in Embodiment 1 rotates about the rotation axis 14i as described above. With this configuration, a position where the minute region 14c is formed on the fluorescent body 14b can be temporally changed. More specifically, the irradiation position of the small spot by the excitation light of the wavelength λA can be temporarily changed in the fluorescent body 14b, so that the energy of the excitation light of the wavelength λA can be prevented from being concentrated in the same position (minute region 14c). In the fluorescent body wheel 14 of Embodiment 1, a decrease in the generation efficiency of the fluorescence in the fluorescent body 14b and deterioration in the emission property of the fluorescent body 14b can be prevented.

In addition, it is preferable for the size (diameter of spot light) of the minute region 14c formed in the fluorescent body 14b to be about several mm, more preferably to be about 2 mm. Therefore, it is desirable for the width of the ring-shaped fluorescent body 14b in the radial direction to be a diameter of the minute region 14c or more.

In the Embodiment 1, the fluorescent body wheel 14 rotates by using the driver 14m. However, the present invention is not limited to the configuration of Embodiment 1 as long as the position where the minute region 14c is formed, namely, the irradiation position of the small spot by the light (beam) of the wavelength λA can be temporarily changed. For example, a fluorescent body extending in a longitudinal direction as a long plate can be provided instead of the circular base plate 14a. The irradiation position of the excitation light can be temporarily changed by reciprocating the plate member in the longitudinal direction, so that a fluorescent body wheel which can prevent a decrease in the generation efficiency and deterioration in the emission property of the fluorescence of the fluorescent body can be obtained. The fluorescent body can be fastened without rotating or reciprocating as long as a desired emission property can be always obtained.

The fluorescence of the wavelength λD generated from the fluorescent body 14b of the fluorescent body wheel 14 is reflected directly or by the circular base plate 14a, travels on the second optical axis O2, and is incident on the first condensing lens 16. The fluorescence of the wavelength λD is changed to the parallel light flux by the first condensing lens 16, and is incident on the dichroic mirror 17. The fluorescence of the wavelength λD passes through the dichroic mirror 17, and travels on the second optical axis O2 in the emission optical path P1. The yellow fluorescence of the wavelength λD separates from the blue light (excitation light) of the wavelength λA by passing through the dichroic mirror 17, and is guided in the direction of the emission optical path Pi.

The second condensing lens 18 and the light transmission control wheel 15 are provided in the emission optical path Pi (between dichroic mirror 17 and light tunnel 4a) in the traveling direction of the yellow fluorescence of the wavelength λD. The second condensing lens 18 is made of at least one lens, condenses the fluorescence of the wavelength λD, so as to obtain a small light spot (SP in FIG. 3), and the small light spot is incident on the light transmission control wheel 15.

The light transmission control wheel 15 separates the red light of the wavelength λB and the green light of the wavelength λC from the yellow fluorescence of the wavelength λD that has passed through the dichroic mirror 17. More specifically, the light transmission control wheel 15 sequentially emits the red light of the wavelength λB, the green light of the wavelength λC, and the blue light of the wavelength λa from the second lighting optical system 11A to the emission optical path Pi on a time-division basis.

As illustrated in FIG. 3, the light transmission control wheel 15 has a circular shape, and includes three fan-shaped regions (segments) divided into three at 120-degree intervals in the circumferential direction, namely, a first region 15a, a second region 15b, and a third region 15c. The first region 15a has an optical property (spectroscopic property) which selects the red light of the wavelength λB (first wavelength range) from the yellow fluorescence of the wavelength λD, and transmits the red light. The second region 15b has an optical property (spectroscopic property) which selects the green light of the wavelength λC (second wavelength range) from the fluorescence of the wavelength λD, and transmits the green light. The third region 15c has an optical property (spectroscopic property) which selects the wavelength λa in the blue light containing the wavelength λa (third wavelength range) from the second lighting optical system 11A (second light source 11), and transmits the wavelength λa. λa.

The wavelength ranges that the first to third regions 15a to 15c transmit are not limited to Embodiment 1. For example, the first region 15a which obtains the red light transmits all of the wavelength λB, but the first region 15a can select a narrower specific wavelength range within the range of the wavelength λB, and transmit the narrower wavelength range, so as to cut the light of an extra wavelength range. The color of the red light can be therefore freely adjusted, and the color purity can be improved. If the first region 15a transmits the wavelength range narrower than near 640 nm, the red light having higher color purity can be obtained.

Similarly, the second region 15b selects a narrower specific wavelength range within the range of the wavelength λC, and transmits the narrower wavelength range, so as to cut the light of an extra wavelength range. The color of the green light can be therefore freely adjusted, and the color purity of the green light can be improved. If the second region 15b transmits a narrow wavelength range near 525 nm, for example, the green light having higher color purity can be obtained. The third region 15c selects the wavelength λa in the blue light containing the wavelength λa, and transmits the wavelength λa, so as to improve the color purity of the blue light. The third region 15c selects a narrower specific wavelength range within the range of the wavelength λa, and transmits the narrower wavelength range, so as to cut the light of an extra wavelength range. The color of the blue light can be therefore freely adjusted, and the color purity of the blue light can be improved. If the third range 15c transmits a narrower wavelength range near 450 nm, for example, the blue light having higher color purity can be obtained.

As illustrated in FIG. 1, the light transmission control wheel 15 is provided in the rotation axis 15i of the driver 15m. The driver 15m is controlled by the controller 3. Upon the driving of the driver 15m, the light transmission control wheel 15 rotates about the rotation axis 15i. In Embodiment 1, the light transmission control wheel 15 rotates 120 times per second in the arrow A1 direction illustrated in FIG. 3, and rotates one time, for example, during one frame (for example, 1/60 second or 1/120 second of double speed). The first region 15a, second region 15b, and third region 15c are sequentially arranged in the emission optical path Pi common to the first and second lighting optical systems 10A, 11A on a time-division basis.

In the lighting device 2, the lighting of the first light source (excitation light source) 10 and the second light source 11 is controlled in accordance with the rotation posture of the light transmission control wheel 15 by the controller 3 (image-processing controller 3a). Namely, the first light source 10 is turned on (ON) and the second light source 11 is turned off (OFF) at a timing in which the first region 15a or the second region 15b of the light transmission control wheel 15 exists in the emission optical path Pi. The first light source 10 is turned off (OFF) and the second light source 11 is turned on (ON) at a timing in which the third region 15c exists in the emission optical path Pi. The emission light of the wavelength λA, wavelength λB, and λC is sequentially emitted from the emission optical path Pi on a time-division basis. In the controller 3 (image-processing controller 3a), a projection image of each color based on the image generation data is generated by driving the light modulator 5b of the image generator 5 in synchronization with the emission timing of the emission light of each color.

In Embodiment 1 and the subsequent embodiments, the circular light transmission control wheel 15 is used as the light separator; however, the present invention is not limited to these embodiments. Another configuration can be adopted as long as the red light and the green light from the fluorescence emitted from the first lighting system 10A and the blue light emitted from the second lighting system 11A can be emitted on a time-division basis. As such a configuration, the light transmission control wheel 15 is formed in a plate shape, and the light transmission control wheel 15 is divided into the first region 15a, second region 15b, and third region 15c. The first region 15a, second region 15b, and third region 15c are switched on the second optical axis O2 by reciprocating the plate member in the divided direction.

[Sequence for Generating Image of Each Color]

Figure 4:
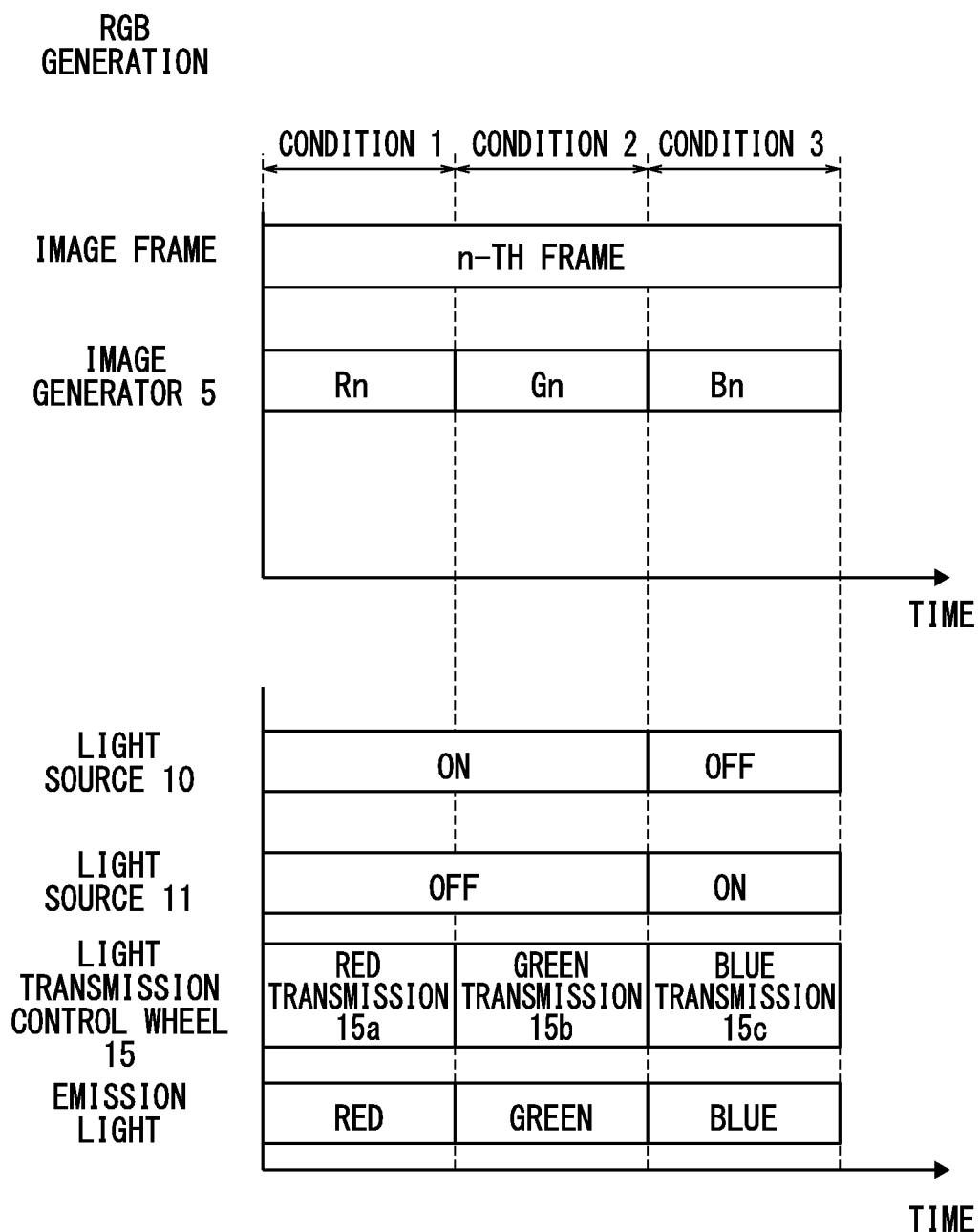
FIG. 4 is a view showing a relationship among colors of light emitted from the lighting device in Embodiment 1 toward an image generator, ON/OFF timing of each light source, colors of light passing through a light transmission control wheel, and an image frame.

A sequence for generating an image of each color in the projector according to Embodiment 1 will be described with reference to FIG. 4 based on an illumination procedure (lighting method) with the lighting device 2 and an image generated in the image generator 5. FIG. 4 is a view showing a relationship between the control for emitting red (R), green (G), and blue (B) light from the lighting device 2 and the image frame. FIG. 4 illustrates the ON/OFF timing of the first (excitation light source) and second light sources 10, 11, the arrangement timing of each region (15a to 15c) of the light transmission control wheel 15 in the emission optical path Pi, and the generation timing of an image of each color in the image generator 5 in accordance with Conditions 1 to 3.

As illustrated in FIG. 4, in the projector 1 of Embodiment 1, the red (R), green (Gn), and blue (Bn) images are generated by the image generator 5 under the control of the controller 3 in the n-th frame of the image generation data. The generation periods of the red (R), green (Gn), and blue (Bn) images are set as Condition 1, Condition 2, and Condition 3, respectively. In the lighting device 2, the red (R), green (G), and blue (b) light is sequentially emitted on a time-division basis, and is irradiated to the light modulator 5b of the image generator 5 by the following procedure in synchronization with the image generation timing. After the gradations of the red (R), green (G), and blue (B) light is controlled with respect to each display pixel by the light modulator 5b, the red (R), green (G), and blue (B) light is emitted from the projector 1 through the projection optical system 6, and is projected on the screen Sc. An enlarged color image is therefore displayed by using a residual image phenomenon of the eyes. The details will be described below.

In Condition 1 illustrated in FIG. 4, the red image (Rn) generated by the controller 3 (image-processing controller 3a) is displayed on the light modulator 5b of the image generator 5. In this case, in the lighting device 2, the blue laser diode of the first light source (excitation light source) 10 is turned on (ON) and the blue light-emitting diode of the second light source 11 is turned off (OFF). The blue light (excitation light) of the wavelength λA emitted from the first light source (excitation light source) 19 is changed into an approximate parallel light flux by the first collimator lens 12, and travels on the first optical axis O1, so as to be incident on the dichroic mirror 17. The blue light (excitation light) of the wavelength λA is reflected by the dichroic mirror 17, and travels toward the first condensing lens 16 disposed in the reflection optical path.

The blue light (excitation light) of the wavelength λA is condensed by the first condensing lens 16, and irradiates the minute region 14c (refer to FIG. 2) of the fluorescent body 14b of the fluorescent body wheel 14. The yellow fluorescence of the wavelength λD containing the red light of the wavelength λB and the green light of the wavelength λC is generated from the minute region 14c of the fluorescent body 14d by the excitation with the blue light (excitation light) of the wavelength λA. The yellow fluorescence of the wavelength λD is reflected directly or by the circular base plate 14a, travels on the second optical axis O2, and is incident on the first condensing lens 16. In this case, a part of the blue light of the wavelength λA as the excitation light is not absorbed by the minute region 14c of the fluorescent body 14b, is reflected by the circular base plate 14a, travels on the second optical axis O2, and is incident on the first condensing lens 16. Such light (yellow fluorescence of wavelength λD and blue light of wavelength λA) is condensed by the first condensing lens 16, travel on the second optical axis O2, and is incident on the dichroic mirror 17.

The dichroic mirror 17 reflects the blue light of the wavelength λA through the first condensing lens 16, and transmits only the yellow fluorescence of the wavelength λD through the first condensing lens 16 toward the emission optical path Pi by the above-described optical property. In the optical path of the first lighting optical system 10A, the yellow fluorescence of the wavelength λD is guided to the emission optical path Pi, and the blue light of the wavelength λA as the excitation light is prevented from being guided to the emission optical path Pi.

The yellow fluorescence of the wavelength λD that has passed through the dichroic mirror 17 is condensed by the second condensing lens 18, and is incident on the light transmission control wheel 15. In this condition 1, the first region 15a (refer to FIG. 3) of the light transmission control wheel 15 is disposed in the emission optical path Pi of the yellow fluorescence of the wavelength λD. Upon the incidence of the yellow fluorescence of the wavelength λD on the first region 15a, the red light of the wavelength λB is only selected, and the red light passes through the first region 15a. The red light of the wavelength λB that has passed through the first region 15a is emitted from the emission optical path Pi toward the light tunnel 4a illustrated in FIG. 1, and is irradiated by the light modulator 5b. The red projection image is thereby generated. The red light of the wavelength λB is only obtained by the operation of the first region 15a, and the red light is emitted from the light transmission control wheel 15, so that the red light can be adjusted to a desirable color, and the color purity of the red light can be improved.

In Condition 2 illustrated in FIG. 4, the green image (Gn) is displayed on the light modulator 5b of the image generator 5 by the control of the controller 3. In this case, the controller 3 maintains the lighting (ON) of the first light source (excitation light source) 10, and maintains the lighting-off (OFF) of the second light source 11. In Condition 2, the second region 15b (refer to FIG. 3) is disposed in the emission optical path Pi of the yellow fluorescence of the wavelength λD by the rotation of the light transmission control wheel 15. Accordingly, when the yellow fluorescence of the wavelength λD emitted from the first lighting optical system 10A and passed through the dichroic mirror 17 is incident on the light transmission control wheel 15, the green light of the wavelength λC is only selected, and passes through the second region 15b. The green light of the wavelength λC that has passed through the second region 15b is emitted toward the light tunnel 4a illustrated in FIG. 1 from the emission optical path Pi, and is irradiated on the light modulator 5b. The green projection image is thereby generated. Only the green light of the wavelength λC is obtained by the operation of the second region 15b, and the green light is emitted from the light transmission control wheel 15, so that the green light can be adjusted to a desired color, and the color purity of the green light can be improved.

Next, in Condition 3 illustrated in FIG. 4, the blue image (Bn) is displayed on the light modulator 5b of the image generator 5 by the control of the controller 3. In this case, the controller 3 turns off (OFF) the first light source (excitation light source) 10, and turns on (ON) the second light source 11. In Condition 3, the third region 15c (refer to FIG. 3) is disposed in the emission optical path Pi by the rotation of the light transmission control wheel 15. Upon the turning on (ON) of the second light source 11, the diffusing light (light flux) containing the wavelength λa is emitted from the second lighting optical system 11A. The diffusing light containing the wavelength λa is condensed by the second collimator lens 13, is changed into an approximate parallel light flux, travels on the third optical axis O3, and is incident on the dichroic mirror 17 disposed on the optical path (second optical path P2).

The dichroic mirror 17 has an optical property (spectroscopic property) which reflects the blue light containing the wavelength λa emitted from the second light source 11. The blue light containing the wavelength λa is therefore reflected by the dichroic mirror in the 90-degree direction, and is guided to the emission optical path Pi. The dichroic mirror 17 operates as the optical path-combining element, which combines the optical path of the blue light containing the wavelength λa emitted from the second lighting optical system 11A with the optical path of the yellow fluorescence of the wavelength λD emitted from the first lighting optical system 10A, namely, the single emission optical path Pi.

The blue light containing the wavelength λa reflected by the dichroic mirror 17 is condensed by the second condensing lens 18, and is incident on the light transmission control wheel 15. In this case, the third region 15c of the light transmission control wheel 15 is disposed in the optical path of the blue light containing the wavelength λa, so that the blue light of the wavelength λa is selected by the third region 15c, and passes through the third region 15c. The passed blue light of the wavelength λa is emitted from the emission optical path Pi toward the light tunnel 4a illustrated in FIG. 1, and is irradiated on the light modulator 5b. The blue projection image is thereby generated. The blue light of the wavelength λa is only obtained by the operation of the third region 15c, and the blue light is emitted from the light transmission control wheel 15, so that the blue light can be adjusted to a desired color, and the color purity of the blue light can be improved.

As described above, in the projector 1 according to Embodiment 1, the light of the wavelengths λB, λC, λa which is sequentially emitted from the lighting device 2 on a time-division basis is guided to the light tunnel 4a of the light-guiding optical system 4, so as to realize uniform lighting intensity. In the projector 1, the sequentially emitted light of the wavelengths λB, λC, λa having uniform lighting intensity is irradiated on the light modulator 5b of the image generator 5 through the light-guiding optical system 4. In the projector 1, as described above, the projection image of each color generated in the image generator 5 is sequentially projected on the screen Sc by the projection optical system 6, so that a full-color image based on the image generation data is generated on the screen Sc by using a residual image phenomenon.

The problem with the conventional lighting device which emits light of respective colors will be described. In the conventional lighting device, an excitation light source emits blue excitation light to a fluorescent body, and light of red (R), green (G), and yellow (Y) wavelength ranges is obtained by a color wheel on a time-division basis from red (R), green (G), and yellow (Y) fluorescence generated from a fluorescent body, and the light is emitted from the wheel. A light source separated from the excitation light source emits a blue (B) light, and the blue light is combined with the emission optical path of the red and green light that has passed through the color wheel by an optical member (color-synthesizing prism). The light is emitted from the emission optical path. Since the red and green light passes through the color wheel, light having a desired color or color purity can be obtained, and emitted. However, the blue light emitted from the second light source is directly combined with the emission optical path without passing through the color wheel. For this reason, the blue light having a desired color and color purity cannot be obtained, and the color purity of the blue light cannot be improved. In this case, use of a light source having high color purity is considered in order to improve the color purity of the blue color, but it increases costs.

On the other hand, in the lighting device 2 of Embodiment 1 according to the present invention, an extra wavelength range is cut not only for the red and green light generated by the excitation with the excitation light from the first light source 10 but also for the blue light from the second light source 11 by passing through the light transmission control wheel 15. The color purity of the blue light can be therefore improved in Embodiment 1. Each color light (emission light) having high color purity can be thereby emitted from the lighting device 2 of Embodiment 1 according to the present invention. In the projector 1 according to Embodiment 1 of the present invention including such a lighting device 2, a clear color image having a high color reproduction range can be projected by using each color light having high color purity. The red and green light is generated only by the first light source 10, so that it is not necessary to prepare a light source with respect to each color, red (R), green (G), and blue (B), and the costs for the lighting device 2 and the projector 1 can be lowered, and the lighting device 2 and the projector 1 can be downsized. By adjusting the wavelength range that each region (15a, 15b, 15c) of the light transmission control wheel 15 transmits, the light of each color can be adjusted to a desired color, and the freedom of color of the color image can be improved.

In Embodiment 1, the first to third regions 15a to 15c of the light transmission control wheel 15 are formed in the circumferential direction at 120-degree intervals, so as to obtain an equal interval of the emission time of each color light. Namely, the periods of Conditions 1 to 3 are set to be equal intervals. However, the present invention is not limited to Embodiment 1, and a reddish projection image can be obtained by increasing the emission time (period) of the red light of Condition 1, for example.

(Embodiment 2)

Figure 5:
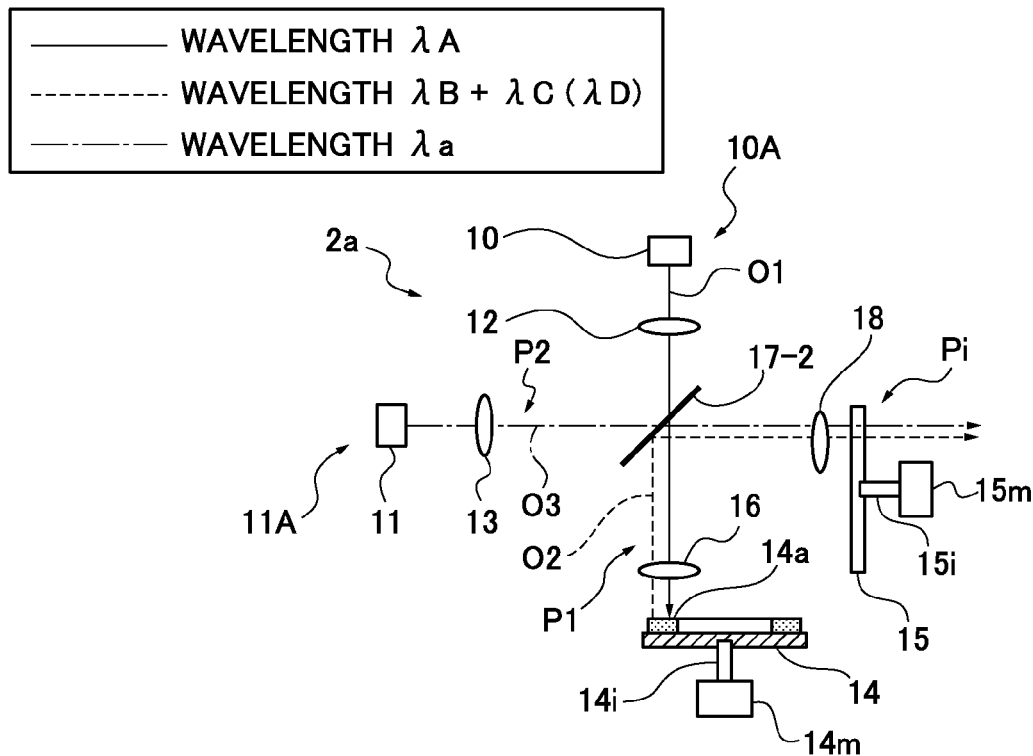
FIG. 5 is an optical view illustrating a lighting device according to Embodiment 2 of the present invention.

Next, a lighting device of Embodiment 2 will be described with reference to FIG. 5. FIG. 5 provides an optical view of a lighting device 2a according to Embodiment 2. The lighting device 2a of Embodiment 2 includes a basic configuration similar to that of the lighting device 2 of Embodiment 1 illustrated in FIG. 1 except that a dichroic mirror 17-2 which transmits the blue light (excitation light) of λA and the blue light of λa, and reflects the yellow fluorescence of λD is used instead of the dichroic mirror 17 in Embodiment 1 which reflects the blue light (excitation light) of λA and the blue light of λa, and transmits the yellow fluorescence of λD. Thus, the detailed description of the configurations similar to those in Embodiment 1 will be omitted. This is the same as in the following embodiments.

The lighting device 2a according to Embodiment 2 includes a first lighting optical system 10A using a first light source 10 and a second lighting optical system 11A using a second light source 11. The first lighting optical system 10A includes the first light source (excitation light source) 10, the first collimator lens 12, the dichroic mirror 17-2, a first condensing lens 16, the fluorescent body wheel 14, the second condensing lens 18, and the light transmission control wheel 15. Referring to FIG. 5, O1 denotes an optical axis (first optical axis) of the blue light emitted from the first light source (excitation light source) 10 and O2 denotes an optical axis (second optical axis) of the fluorescence generated from the fluorescent body wheel 14. In addition, P1 in FIG. 5 denotes an optical path (first optical path) of the first lighting optical system 10A.

The second lighting optical system 11A includes the second light source 11, the second collimator lens 13, the dichroic mirror 17-2, the second condensing lens 18, and the light transmission control wheel 15. Referring to FIG. 5, O3 denotes an optical axis (third optical axis) of the blue light of the wavelength λa emitted from the second light source 11. In addition, P2 in FIG. 5 denotes an optical axis (second optical axis) of the second lighting optical system 11A.

The dichroic mirror 17 in the above Embodiment 1 has an optical property which reflects the blue light (excitation light) of the wavelength λA and the blue light of the wavelength λa, and transmits the yellow fluorescence of the wavelength λD. On the other hand, the dichroic mirror 17-2 in Embodiment 2 has an optical property which transmits the blue light (excitation light) of the wavelength λA and the blue light of the wavelength λa, and reflects the yellow fluorescence of the wavelength λD. In Embodiment 1, the first condensing lens 16 and the fluorescent body wheel 14 are disposed in the reflection optical path of the blue light (excitation light) of the wavelength λA by the dichroic mirror 17. On the other hand, in Embodiment 2, the first condensing lens 16 and the fluorescent body wheel 14 are disposed in the transmission optical path of the blue light (excitation light) of the wavelength λA by the dichroic mirror 17-2.

The blue light (excitation light) of the wavelength λA from the first light source (excitation light source) 10 of the first lighting optical system 10A and the blue light of the wavelength λa from the second light source 11 of the second lighting optical system 11A are incident on one surface (front surface) of the dichroic mirror 17-2, and pass through the dichroic mirror 17-2. In this case, the light is incident on the dichroic mirror 17-2 from the directions in which the axis (first optical axis O1) of the incident optical axis of the blue light (excitation light) of the wavelength λA from the first light source (excitation light source) 10 and the axis (third optical axis O3) of the incident optical axis of the blue light of the wavelength λa from the second light source 11 are substantially orthogonal to each other. The blue light of the wavelength λA and the blue light of the wavelength λa pass through the dichroic mirror 17-2, and travel in different directions, so that the blue light is prevented from being mixed in the emission optical path Pi. In addition, in Embodiment 2, the first light source 10 is turned off (OFF) while the second light source 11 is lighting (ON), so that the light is further prevented from being mixed.

The optical path of the first lighting optical system 10A and the optical path of the second lighting optical system 11A in the lighting device 2a in Embodiment 2 will be described. In addition, the detailed description of the lighting procedure (lighting method) by the lighting device 2a and the image generation procedure in the projector including the lighting device 2a according to Embodiment 2 will be omitted because these are similar to those in Embodiment 1. At first, the blue light (excitation light) of the wavelength λA emitted from the first light source (excitation light source) 10 of the first lighting optical system 10A is changed to an approximate parallel light flux by the first collimator lens 12, and the parallel light flux travels in the first optical axis O1 and is incident on the dichroic mirror 17-2. The blue light (excitation light) of the wavelength λA passes through the dichroic mirror 17-2, and travels toward the first condensing lens 16 disposed in the transmission optical path.

The blue light (excitation light) of the wavelength λA is condensed by the first condensing lens 16, and irradiates a minute region 14c (refer to FIG. 2) of a fluorescent body 14b in the fluorescent body wheel 14. Then, by the excitation with the blue light (excitation light) of the wavelength λA, the yellow fluorescence of the wavelength λD containing the red light of the wavelength λB and the green light of the wavelength λC is generated from the minute region 14c of the fluorescent body 14b. The yellow fluorescence of the wavelength λD reflects directly or by a circular base plate 14a, travels on the second optical axis O2, and is incident on the first condensing lens 16. In this case, a part of the blue light of the wavelength λA as the excitation light is not absorbed in the minute region 14c of the fluorescent body 14b, is reflected by the circular base plate 14a, travels on the second optical axis O2, and is incident on the first condensing lens 16. Such light (yellow fluorescence of wavelength λD and blue light of wavelength λA) is condensed by the first condensing lens 16, travels on the second optical axis O2, and is incident on the dichroic mirror 17-2.

The dichroic mirror 17-2 transmits the blue light (light flux) of the wavelength λA through the first condensing lens 16, reflects only the fluorescence (light flux) of the wavelength λD through the first condensing lens 16, and travels toward the emission optical path Pi. In Embodiment 2, the yellow fluorescence of the wavelength λD is guided to the emission optical path Pi in the optical path of the first lighting optical system 10A, and the blue light of the wavelength λA as the excitation light is prevented from being guided to the emission optical path Pi.

The yellow fluorescence of the wavelength λD reflected by the dichroic mirror 17-2 is condensed by the second condensing lens 18, and is incident on the light transmission control wheel 15. In this case, the first region 15a of the light transmission control wheel 15 is disposed in the emission optical path Pi (refer to FIG. 3). Upon the incidence of the yellow fluorescence of the wavelength λD on the first region 15a, the red light of the wavelength λB only passes through the first region 15a. The red light of the wavelength λB that has passed through the first region 15a is emitted from the lighting device 2a through the emission optical path Pi.

When the second region 15b of the light transmission control wheel 15 is disposed in the emission optical path Pi of the yellow fluorescence of the wavelength λD, the green light of the wavelength λC in the yellow fluorescence of the wavelength λD only passes through the second region 15b. The green light of the wavelength λC that has passed through the second region 15b is emitted from the lighting device 2a through the emission optical path Pi.

The diffusing blue light containing the wavelength λa emitted from the second light source 11 of the second lighting optical system 11A is condensed by the second collimator lens 13, and is changed into an approximate parallel light flux. The blue light containing the wavelength λa as the parallel light flux travels on the third optical axis O3, and is incident on the dichroic mirror 17-2 disposed on the optical path.

The dichroic mirror 17-2 has an optical property which transmits the blue light containing the wavelength λa emitted from the second light source 11. The blue light containing the wavelength λa therefore passes through the dichroic mirror 17-2, and is guided to the emission optical path Pi. In this case, the dichroic mirror 17-2 operates as an optical path-combining element which combines the optical path for the blue light containing the wavelength λa emitted from the second lighting optical system 11A and the optical path for the yellow fluorescence of the wavelength λD emitted from the first lighting optical system 10A toward the single emission optical path Pi.

The blue light containing the wavelength λa reflected by the dichroic mirror 17-2 is condensed by the second condensing lens 18, and is incident on the light transmission control wheel 15. In this case, the third region 15c of the light transmission control wheel 15 is disposed in the optical path of the blue light containing the wavelength λa. The blue light of the wavelength λa is selected by the third region 15c, and passes through the third region 15c. The passed blue light of the wavelength λa is emitted from the lighting device 2a through the emission optical path Pi.

As described above, in the lighting device 2a of Embodiment 2, not only do the red light (R) and the green light (G) derived from the fluorescence generated from the fluorescent body wheel 14 pass through the light transmission control wheel 15, the blue light (B) directly emitted on the emission optical path Pi from the second light source 11 also passes through. With this configuration, only the blue light of the wavelength λa narrower than the wavelength range of the second light source 11 can be obtained, so that the color purity of the blue light can be improved. The red light (R), green light (G), and blue light (B) having high color purity can be therefore emitted from the lighting device 2a. In the projector including the lighting device 2a, a clear color image having a high color reproduction area can be projected by using light having high color purity.

(Embodiment 3)

Figure 6:
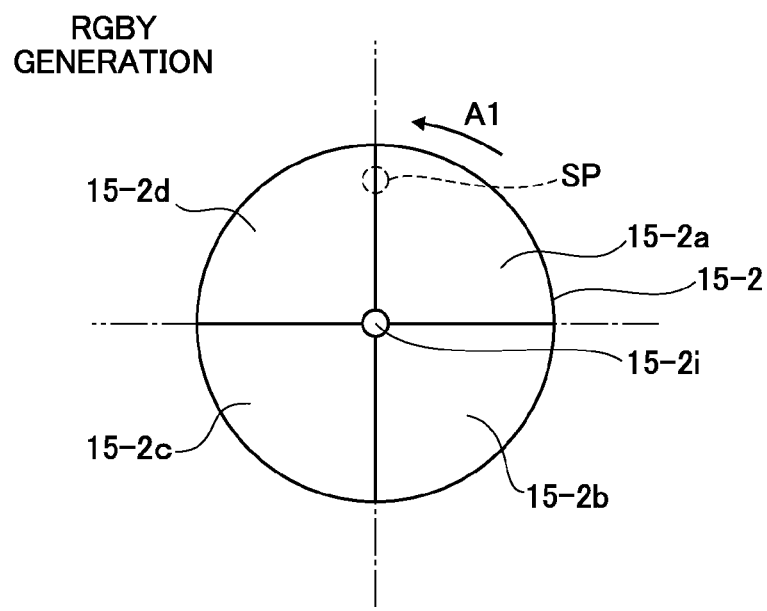
FIG. 6 is a plan view illustrating an enlarged light transmission control wheel for use in a lighting device in Embodiment 3 of the present invention.
Figure 7:
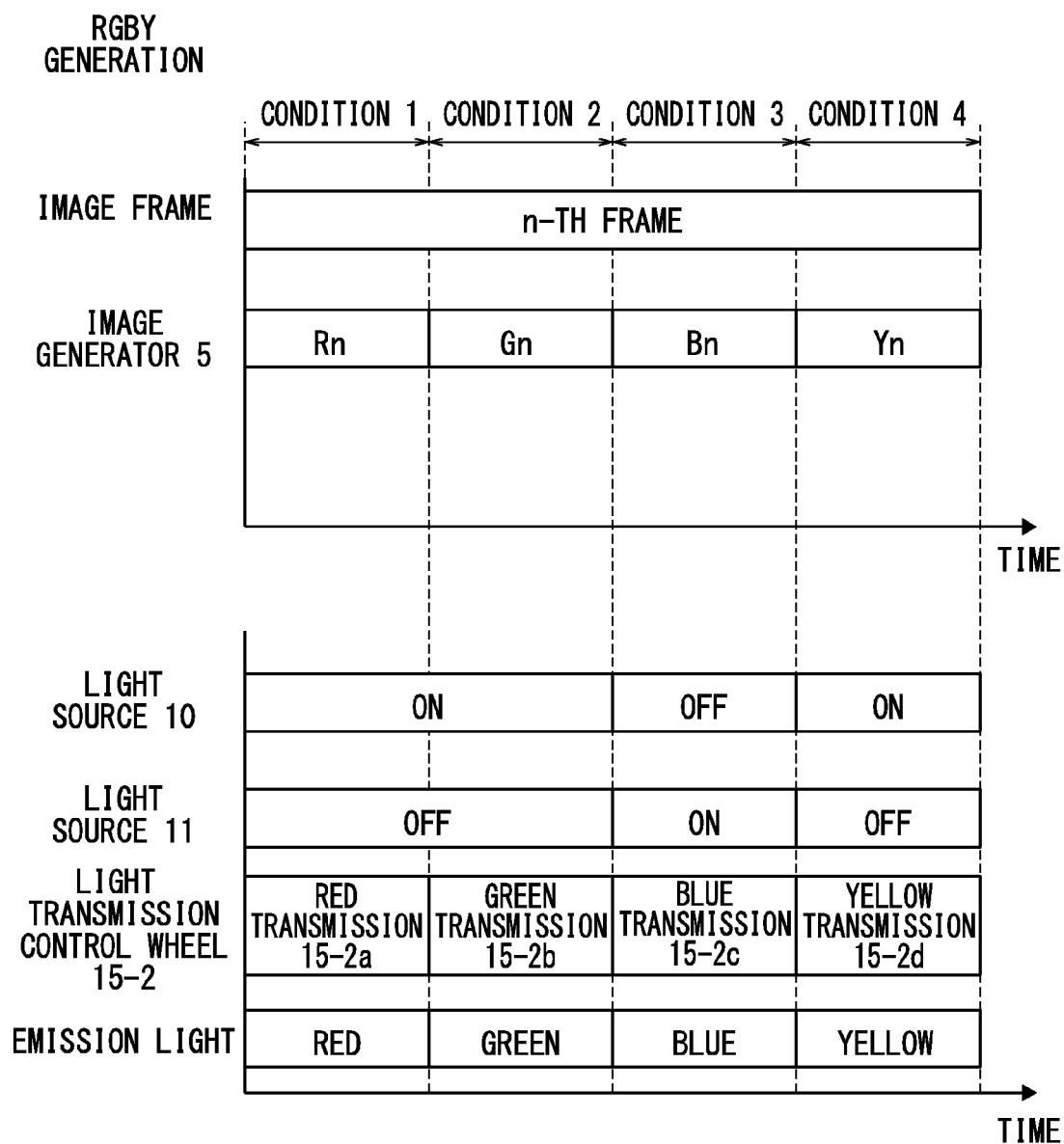
FIG. 7 is a view showing a relationship among colors of light emitted from the lighting device in Embodiment 3 toward an image generator, ON/OFF timing of each light source, and colors of light passing through a light transmission control wheel, and an image frame.

Next, a projector including a lighting device according to Embodiment 3 will be described with reference to FIGS. 6, 7. FIG. 6 provides an enlarged plan view of a light transmission control wheel 15-2 for use in the lighting device according to Embodiment 3, and a view as seen from the light-incident side. FIG. 7 provides a view illustrating a relationship between the control, which emits red (R), green (G), blue (B), and yellow (Y) light from the lighting device in Embodiment 3, and an image frame. The projector including the lighting device of Embodiment 3 includes a basic configuration similar to that of the projector 1 including the lighting device 2 in Embodiment 1 illustrated in FIG. 1 except that the light transmission control wheel 15-2 illustrated in FIG. 6 is used instated of the light transmission control wheel 15. Thus, the description of the configurations similar to those in Embodiment 1 will be omitted.

The light transmission control wheel 15-2 for use in Embodiment 3 selects the yellow (Y) light, and transmits the yellow (Y) light in addition to the red (R), green (G), and blue (B) light. The yellow (Yn) image is also generated (displayed) in addition to the red (Rn), green (Gn), and blue (Bn) images by using the light transmission control wheel 15-2.

As illustrated in FIG. 6, the light transmission control wheel 15-2 has a circular shape, and four fan-shaped regions (segments) divided at 90-degree intervals in the circumferential direction, a first region 15-2a, second region 15-2b, third region 15-2c, and fourth region 15-2d. The light transmission control wheel 15-2 rotates about a rotation axis 15-2i in the arrow A1 direction. The first to third regions 15-2a to 15-2c have an optical property (spectroscopic property) similar to that of the first to third regions 15a to 15c of the light transmission control wheel 15 in Embodiment 1, as illustrated in FIG. 3. Namely, the first region 15-2a has an optical property (spectroscopic property) which selects the red light of the wavelength λB (first wavelength range) from the fluorescence of the wavelength λD, and transmits the red light. The second region 15-2b has an optical property (spectroscopic property) which selects the green light of the wavelength λC (second wavelength range) from the yellow fluorescence of the wavelength λD, and transmits the green light. The third region 15-2c has an optical property (spectroscopic property) which selects the wavelength λa in the blue light containing the wavelength λa (third wavelength range) emitted from the second lighting optical system 11A (second light source 11), and transmits the wavelength λa. The fourth region 15-2d added in Embodiment 3 has an optical property (spectroscopic property) which transmits the mixed color of the wavelengths B, C, namely, the yellow fluorescence (yellow light) of the wavelength λD.

In addition, as described in Embodiment 1, the wavelength ranges that the first to third regions 15-2a to 15-2c transmit are not limited to the ranges in Embodiment 3. The first to third regions 15-2a to 15-2c can transmit narrower ranges within the wavelengths λB, λC, λa. The colors of red (R), green (G), and blue (B) can be freely adjusted, and color purity can be also improved.

Similarly, the fourth region 15-2d selects a narrower specific wavelength range within the range of the wavelength λD, and cuts an extra wavelength range, so that the color of the yellow (Y) can be freely adjusted, and the color purity of the yellow light can be also improved.

Emission times of red (R), green (G), blue (B), and yellow (Y) are determined based on an area (angle) of each region (segment) of the light transmission control wheel 15-2. However, the emission times can be adjusted according to light intensity of each light, so as to obtain white as a whole. In the light transmission control wheel 15-2 in Embodiment 3 illustrated in FIG. 6, the first to fourth regions 15-2a to 15-2d are divided by 90 degrees. However, the present invention is not limited to Embodiment 3. For example, when the emission amount of yellow (emission power) is large, the area (angle) of the fourth region 15-2d can be decreased, and the emission time of the yellow light can be set to be shorter than the emission time of another color light. With this adjustment, the color balance (color adjustment) can be preferably maintained. Moreover, when maintaining constant irradiation power of the excitation light from the first light source (excitation light source) 10, the emission time of red (R), green (G), and yellow (Y) light is adjusted, so that the brightness of an image to be generated can be adjusted.

[Sequence for Generating Each Color Image]

Next, a sequence for generating each color image in Embodiment 3 will be described with reference to FIG. 7. FIG. 7 illustrates the ON/OFF timing of the first light source (excitation light source) 10 and the second light source 11 corresponding to Conditions 1 to 4, the arrangement timing of each region (15-2a to 15-2d) of the light transmission control wheel 15-2 in the emission optical path, and the timing for generating each color image in the image generator 5. In Condition 1, as illustrated in FIG. 7, the red image (Rn) generated by the control of the controller 3 (image-processing controller 3a) is displayed on the light modulator 5b of the image generator 5. In Condition 1, the first region 15-2a of the light transmission control wheel 15-2 is arranged in the emission optical path Pi. In this case, the blue laser diode, which is the first light source (excitation light source) 10, is turned on (ON), and the blue light-emitting diode which is the second light source 11, is turned off (OFF) under the control of the controller 3 in the lighting device 2.

Similar to Embodiment 1, the yellow fluorescence of the wavelength λD containing the red light of the wavelength λB and the green light of the wavelength λC is thereby generated from the fluorescent body wheel 14 excited by the blue light (excitation light) of the wavelength λA from the first light source (excitation light source) 10. The yellow fluorescence of the wavelength λD passes through the dichroic mirror 17 after being condensed by the first condensing lens 16, is condensed by the second condensing lens 18, and is incident on the light transmission control wheel 15-2. Only the red light of the wavelength λB is selected from the yellow fluorescence of the wavelength λD incident on the light transmission control wheel 15-2, and passes through the first region 15-2a. The red light of the wavelength λB that has passed through the first area 15-2a is emitted toward the light tunnel 4a illustrated in FIG. 1 from the emission optical path Pi, and is irradiated on the light modulator 5b. A red projection image is thereby generated.

Next, in Condition 2 illustrated in FIG. 7, the green image (Gn) is displayed on the light modulator 5b of the image generator 5. In this case, the controller 3 maintains the lighting (ON) of the first light source (excitation light source) 10 and maintains the lighting-off (OFF) of the second light source 11. In Condition 2, the second region 15-2b of the light transmission control wheel 15-2 is arranged in the emission optical path Pi of the yellow fluorescence of the wavelength λD. Therefore, upon the incidence of the yellow fluorescence of the wavelength λD that has passed through the dichroic mirror 17 on the light transmission control wheel 15-2, only the green light of the wavelength λB is selected, and passes through the second area 15-2b. The green light of the wavelength λC that has passed through the second area 15-2b is emitted toward the light tunnel 4a illustrated in FIG. 1 from the emission light path Pi, and is irradiated on the light modulator 5b. A green projection image is thereby generated.

In Condition 3, as illustrated in FIG. 7, the blue image (Bn) is displayed on the light modulator 5b of the image generator 5. In this case, the controller 3 turns off (OFF) the first light source (excitation light source) 10, and turns on (ON) the second light source 11. In Condition 3, the third region 15-2c of the light transmission control wheel 15-2 is disposed in the emission light path Pi. In response to the turning on (ON) of the second light source 11, the blue light containing the wavelength λa emitted from the second lighting optical system 11A is condensed by the second collimator lens 13, and is incident on the dichroic mirror 17.

The blue light containing the wavelength λa is reflected by the dichroic mirror 17, is condensed by the second condensing lens 18, and is incident on the light transmission control wheel 15-2. The blue light of the wavelength λa is selected from the blue light containing the wavelength λa incident on the light transmission control wheel 15-2, and passes through the third region 15-2c. The passed blue light of the wavelength λa is emitted toward the light tunnel 4a illustrated in FIG. 1 from the emission optical path Pi, and is irradiated on the light modulator 5b. The blue projection image is thereby generated.

In the condition 4 illustrated in FIG. 7, the yellow image (Yn) is displayed on the light modulator 5b of the image generator 5 by the control of the controller 3. In this case, the controller 3 turns on (ON) the first light source (excitation light source) 10, and turns off (OFF) the second light source 11. In the condition4, the fourth region 15-2d of the light transmission control wheel 15-2 is disposed in the emission light path Pi. Upon the incidence of the yellow fluorescence of the wavelength λD that has passed through the dichroic mirror 17 on the light transmission control wheel 15-2, the yellow fluorescence (yellow light) of the wavelength λD containing the wavelength λB and the wavelength λC passes through the second region 15-2b. The yellow fluorescence (yellow light) of the wavelength λD that has passed through the fourth region 15-2b is emitted from the emission light path Pi toward the light tunnel 4a, as illustrated in FIG. 1, and is irradiated on the light modulator 5b. The yellow projection image is thereby generated.

As illustrated above, in the projector of Embodiment 3, the light of the wavelengths λB, λC, λa, and λD is guided to the light tunnel 4a of the light-guiding optical element 4 to be equal illuminance. In the projector 1, the sequentially emitted light of the wavelengths λB, λC, λa, and λD having equal illuminance is irradiated on the light modulator 5b of the image generator 5 through the light-guiding optical system 4. In the projector, the projection image of each color generated by the image generator 5 is sequentially projected on the screen Sc by the projection optical system 6, so that a full-color image based on the image generation data is generated on the screen Sc by using a residual image phenomenon.

As described above, in Embodiment 3, similar to Embodiment 1, the colors of red (R), green (G), blue (B), and yellow (Y) light can be freely adjusted, and the color purity can be also improved. Since the yellow light is added to the emission light from the lighting device, a brighter image can be obtained, and a color reproduction range can be expanded.

(Embodiment 4)

Figure 8:
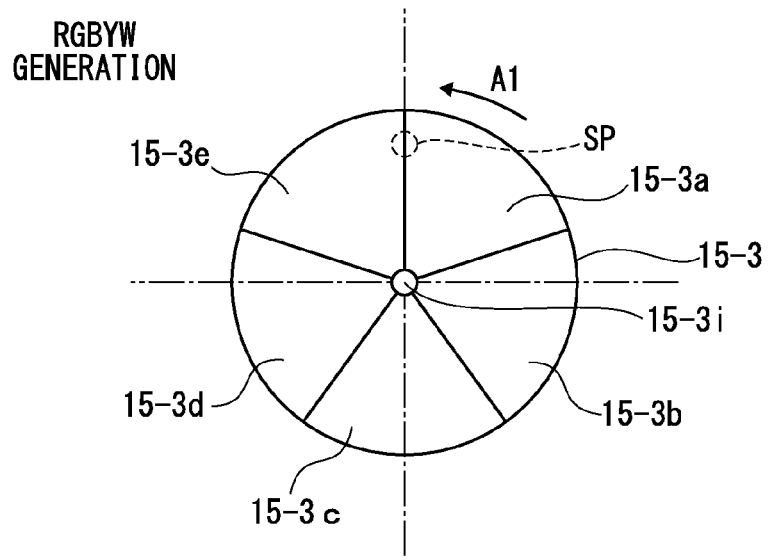
FIG. 8 is a plan view illustrating an enlarged light transmission control wheel for use in a lighting device in Embodiment 4 of the present invention.
Figure 9:
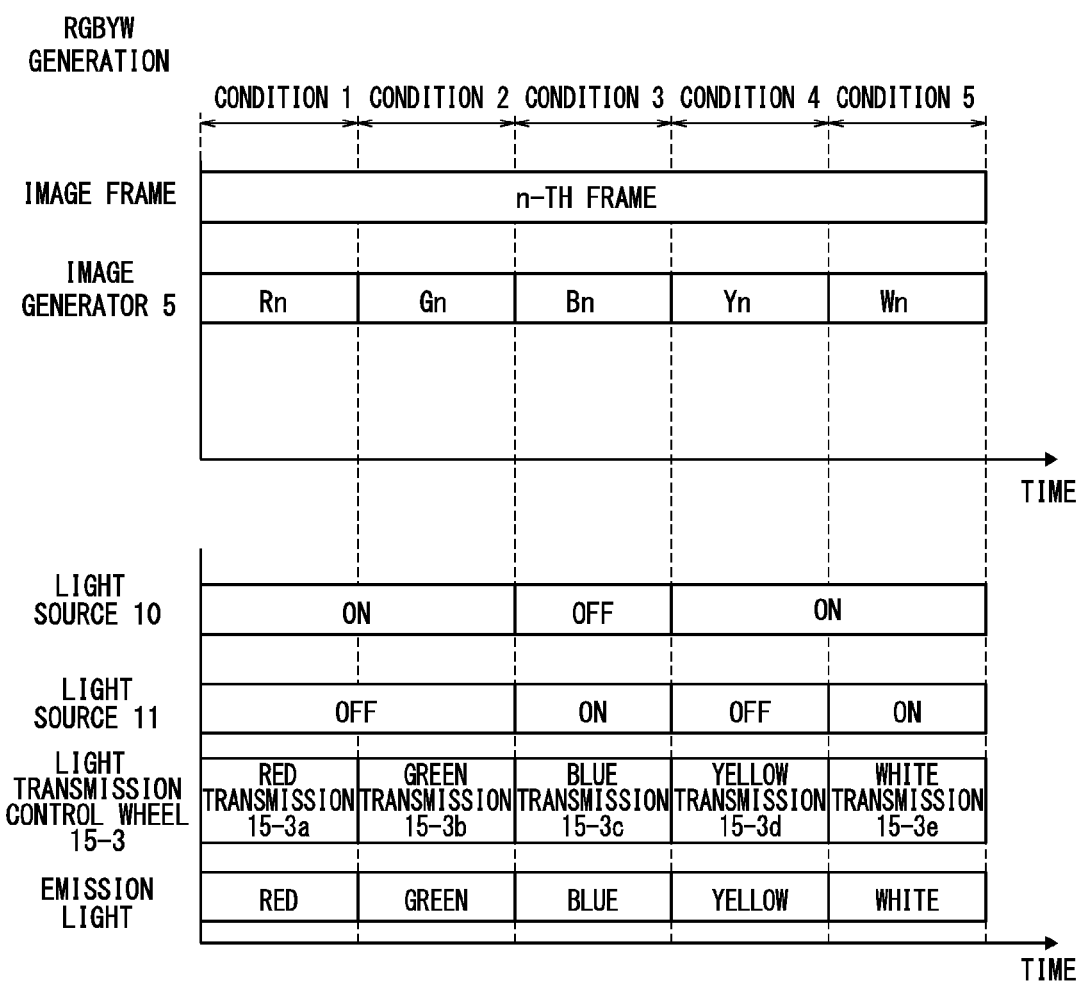
FIG. 9 is a view showing a relationship among colors of light emitted from the lighting device in Embodiment 4 toward an image generator, ON/OFF timing of each light source, colors of light passing through a light transmission control wheel, and an image frame.

Next, a projector including a lighting device according to Embodiment 4 of the present invention will be described with reference to FIGS. 8, 9. FIG. 8 provides an enlarged plan view of a light transmission control wheel 15 for use in the lighting device according to Embodiment 4, and is a view as seen from a light incident side. FIG. 9 is a view showing the relationship between the control, which emits light of red (R), green (G), blue (B), yellow (Y), and white (W) from the lighting device in Embodiment 4, and the image frame. The lighting device in Embodiment 4 includes a basic configuration similar to that of the projector 1 including the lighting device 2 in Embodiment 1, as illustrated in FIG. 1 except that the light transmission control wheel 15-3 illustrated in FIG. 8 is used instead of the light transmission control wheel 15. Thus, the detailed description of the configurations similar to those in Embodiment 1 will be omitted.

The light transmission control wheel 15-3 for use in Embodiment 4 selects white (W) light, and transmits the white light in addition to the red (R), green (G), blue (B), and yellow (Y) light. The white (Wn) image is generated (displayed) in addition to the red (Rn), green (Gn), blue (Bn), and yellow (Yn) images by using the light transmission control wheel 15-3.

In Embodiment 4, the light transmission control wheel 15-3 has a circular shape, and includes five fan-shaped regions (segments) divided into five at about 72-degree intervals in the circumferential direction, a first region 15-3a, second region 15-3b, third region 15-3c, fourth region 15-3d, and fifth region 15-3e. The light transmission control wheel 15-3 rotates about a rotation axis 15-3i in the arrow A1 direction. The first to fourth regions 15-3a to 15-3d include an optical property (spectroscopic property) similar to the first to fourth regions 15-2a to 15-2d of the light transmission control wheel 15-2 in Embodiment 3, as illustrated in FIG. 6. Thus, the detailed description thereof will be omitted.

On the other hand, the fifth region 15-3e includes an optical property (spectroscopic property) which simultaneously transmits the yellow fluorescence (yellow light) of the wavelength $\lambda D$ containing the wavelength $\lambda B$ and the wavelength $\lambda C$ generated from the fluorescent body wheel 14 and the wavelength $\lambda a$ in the blue light emitted from the second light source 11. For this reason, the fifth region 15-3e is almost transparent in Embodiment 4. The fifth region 15-3e has an optical property (spectroscopic property) which transmits the yellow light of the wavelength $\lambda D$ derived from the first light source (excitation light source) 10 and the light of the wavelength narrower than the wavelength $\lambda a$ derived from the second light source 11, so as to cut light of an extra wavelength range. With this configuration, the white balance (color of white light) can be freely adjusted, and the color purity of the white color can be also improved.

Next, a sequence for generating each color image in Embodiment 4 will be described with reference to FIG. 9. FIG. 9 illustrates the ON/OFF timing of the first light source (excitation light source) 10 and the second light source 11 corresponding to Conditions 1 to 5, the arrangement timing of each region (15-3a to 15-3e) of the light transmission control wheel 15-3 in the emission optical path, and the timing for generating each color image in the image generator 5. The operations when generating an image corresponding to Conditions 1 to 4 illustrated in FIG. 9, namely, the ON/OFF timing of the first light source (excitation light source) 10 and the second light source 11, the light transmission timing of each color light in the light transmission control wheel 15-3, and the timing for generating each color image in the image generator 5 are similar to those in Embodiment 3 illustrated in FIG. 7. Thus, the detailed description thereof will be omitted. The operation when generating an image in the condition 5 will be described below.

In Condition 5 illustrated in FIG. 9, the white image (Wn) is displayed on the light modulator 5b of the image generator 5 by the control of the controller 3. In this case, the controller 3 maintains the lighting (ON) of the first light source (excitation light source) 10 and turns on (ON) the second light source 11. In Condition 5, the fifth region 15-3e of the light transmission control wheel 15-3 is arranged in the emission light path Pi.

In Condition 5, the yellow fluorescence of the wavelength $\lambda D$ excited by the first light source (excitation light source) 10 passes through the dichroic mirror 17, and is incident on the light transmission control wheel 15-3. At the same time, the blue light containing the wavelength $\lambda a$ from the second light source 11 is reflected by the dichroic mirror 17, and is incident on the light transmission control wheel 15-3. The yellow fluorescence (yellow light) of the wavelength $\lambda D$ and the blue light of the wavelength $\lambda a$ (or light of wavelength narrower than wavelength $\lambda D$ and wavelength $\lambda a$) are selected, and pass through the fifth region 15-3e, so that the white light (W) in which these colors are mixed based on the principle of additive mixture is emitted from the emission light path Pi. This white light is emitted from the emission light path Pi toward the light tunnel 4a illustrated in FIG. 1, and is irradiated on the light modulator 5b. The white projection image is thereby generated.

As described above, in Embodiment 4, the red (R), green (G), blue (B), yellow (Y), and white (W) light sequentially emitted from the lighting device on a time-division basis is guided to the light tunnel 4a of the light-guiding optical system 4 to be equal illuminance. In the projector, the sequentially emitted red (R), green (G), blue (B), yellow (Y), and white (W) light having equal illuminance is irradiated on the light modulator 5b of the image generator 5 through the light-guiding optical system 4. In the projector 1, a projection image of each color generated in the image generator 5 is sequentially projected on the screen Sc by the projection optical system 6. A full-color image based on image generation data is therefore generated on the screen Sc by using a residual image phenomenon.

In Patent Document 1, brightness of a projection image is improved by using the white light generated by synthesizing the red, green, and blue light. However, as described in Embodiment 1, in the conventional lighting device as described in Patent Document 1, the color purity of the blue light is not improved. For this reason, the color purity of the white light, which is synthesized by using such blue light, cannot be improved. It is limited to obtain a clear projection image.

On the other hand, in Embodiment 4, when obtaining the white light by synthesizing the red, green, and blue light, the color of the white light can be adjusted, and the color purity is also improved because the white light passes through the light transmission control wheel 15-3. Consequently, in the projector of Embodiment 4, a brighter and clearer color image can be projected.

(Embodiment 5)

Figure 10:
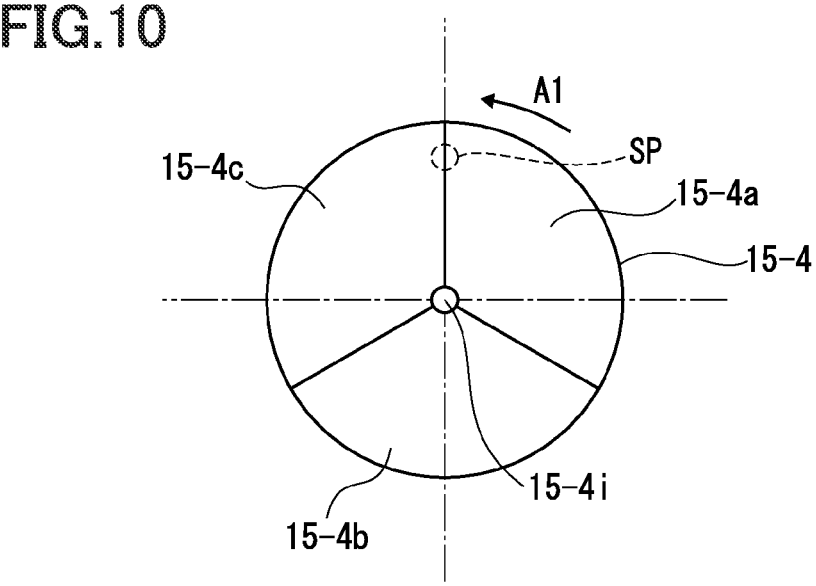
FIG. 10 is a plan view illustrating an enlarged light transmission control wheel (light separator) for use in the lighting device in Embodiment 5 of the present invention.
Figure 11:
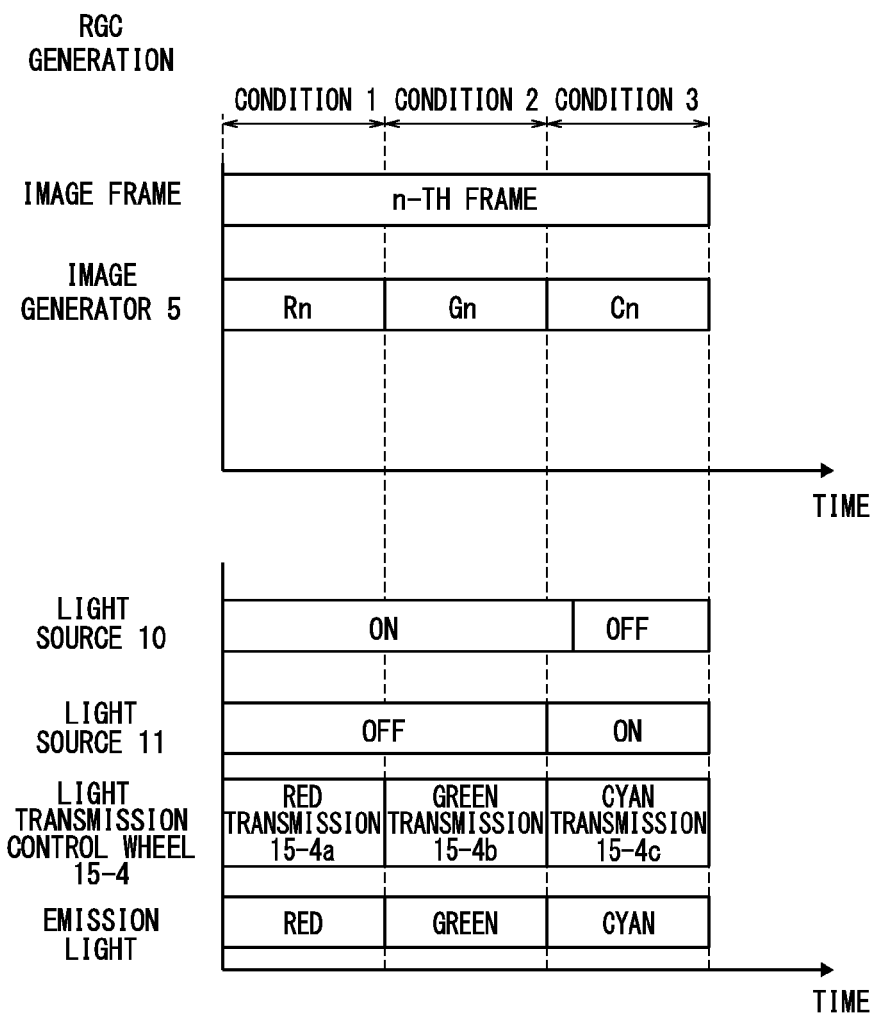
FIG. 11 is a view showing a relationship among colors of light emitted from the lighting device in Embodiment 5 toward an image generator, ON/OFF timing of each light source, colors of light passing through a light transmission control wheel, and an image frame.

Next, a projector including a lighting device according to Embodiment 5 will be described with reference to FIGS. 10, 11. FIG. 10 provides an enlarged plan view of a light transmission control wheel 15-4 for use in the lighting device according to Embodiment 5, and is a view as seen from the light-incident side. FIG. 11 is a view illustrating the relationship between the control for emitting the red (R), green (G), and cyan (C) light from the lighting device in Embodiment 5 and the image frame. The projector including the lighting device of Embodiment 5 includes a basic configuration similar to that of the projector 1 including the lighting device 2 of Embodiment 1 illustrated in FIG. 1 except that a blue LD light source having a central light-emitting wavelength of 450 nm is used as the second light source 11, and the light transmission control wheel 15-4 illustrated in FIG. 10 is used as the light transmission control wheel 15. For this reason, the detailed description of the configurations similar to those in Embodiment 1 will be omitted. In Embodiment 5, the red (Rn), green (Gn), and cyan (Cn) images are generated (displayed) in the image generator 5 (light modulator 5b).

[Sequence for Generating Each Color Image]

Next, a sequence for generating each color image in Embodiment 5 will be described with reference to FIG. 11. FIG. 11 illustrates the ON/OFF timing of the first light source (excitation light source) 10 and the second light source 11 corresponding to Conditions 1 to 3, the transmission timing of each color light in the light transmission control wheel 15-4, and the timing for generating each color image in the image generator 5. The operations when generating an image corresponding to Conditions 1, 2 illustrated in FIG. 11, namely, the ON/OFF timing of the first light source (excitation light source) 10 and the second light source 11, the transmission timing of each color light in the first region 15-4a and the second region 15-4b of the light transmission control wheel 15-4, and the timing for generating each color image in the image generator 5 are similar to those in Embodiment 1 illustrated in FIG. 4. Thus, the detailed description thereof will be omitted. The operation when generating an image in Condition 3 will be described as follows.

In Condition 3 illustrated in FIG. 11, the blue image (Bn) is displayed on the light modulator 5b of the image generator 5 by the control of the controller 3. In this case, the controller 3 maintains the lighting (ON) of the first light source (excitation light source) 10 for a part of time in the period (time) of Condition 3. The second light source 11 is turned on (ON) during the period (time) of Condition 3. In Condition 3, the blue light from the second light source 11 and the yellow fluorescence (yellow light) generated from fluorescent body wheel 14 are mixed in the emission light path Pi for a predetermined time, and the mixed light is emitted. The mixed light is incident on the light transmission control wheel 15-4, and a part (for example, wavelength range containing green light) of the yellow fluorescence (yellow light) and the blue light (or a part of light such as wavelength λa) derived from the second light source 11 pass through the third region 15-4c for transmitting a cyan color, so that the light of the cyan color (C) is generated. The cyan (C) light is emitted from the emission optical path Pi from the light tunnel 4a illustrated in FIG. 1, and is irradiated on the light modulator 5b. A cyan projection image is thereby generated for a predetermined time. In the remaining time in Condition 3, the first light source (excitation light source) 10 is turned off (OFF), and the second light source 11 is only turned on (ON), so that the blue light is only emitted on the emission light path Pi. The blue light (for example, light of wavelength λa) passes through the third region 15-4c, and is emitted from the emission light path Pi, and is irradiated on the light modulator 5b. A blue projection image is thereby generated.

As described above, in Embodiment 5, the optical property (spectroscopic property) of the third region 15-4c of the light transmission control wheel 15-4, which transmits the blue light, is adjusted so as to transmit the cyan color. Condition 3 has a predetermined time (predetermined period) which simultaneously turns on (ON) the first light source (excitation light source) 10 and the second light source 11. With this configuration, the mixed blue light and the fluorescence pass through the third region 15-4, and the color of blue light, which is emitted from the lighting device, is adjusted to the cyan color. Consequently, when using the LD light source having a central light-emitting wavelength of 450 nm as Embodiment 5, the chromaticity coordinate of the blue light is fixed in one certain point, but the chromaticity coordinate of blue can be finely adjusted by the generation of the cyan color, and thus, the freedom of the blue light color can be improved.

In Embodiment 5, as illustrated in FIG. 11, the lighting time of the first light source (excitation light source) 10 of the LD light source is reduced in Condition3. However, the present invention is not limited to the configuration of Embodiment 5, and the lighting time of the first light source (excitation light source) 10 in Condition 3 can be further increased, and the irradiating time of the cyan light can be increased. The wavelength range which is transmitted through the third region 15-4c for transmitting a cyan color can be arbitrarily adjusted. The cyan light having an arbitrary color can be generated by the combination of the lighting time of the first light source (excitation light source) 10 and the third region 15-4 having an adjusted transmission wavelength range, and thus, the color reproduction range can be expanded.

(Embodiment 6)

Figure 12:
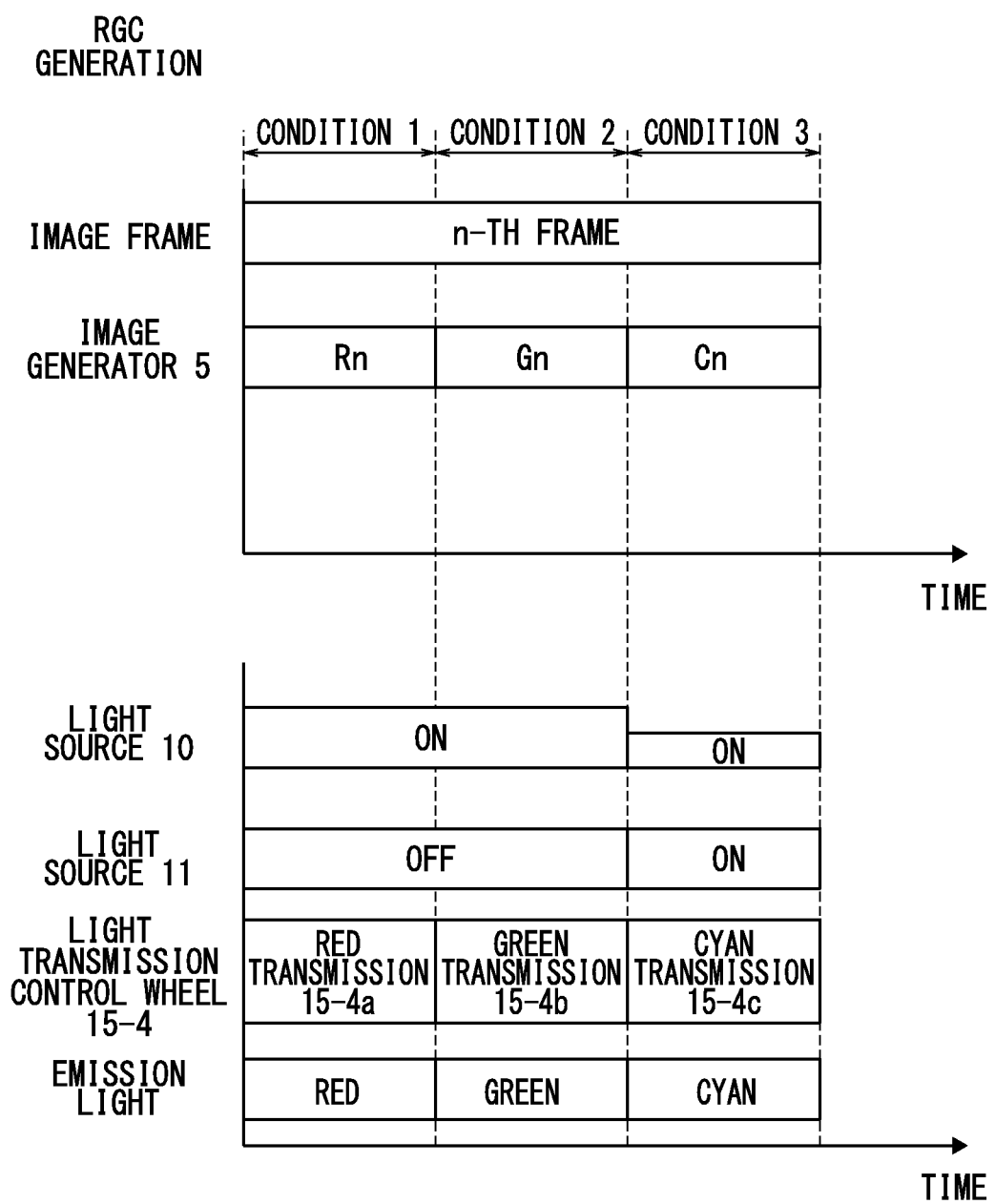
FIG. 12 is a view showing a relationship among colors of light emitted from the lighting device in Embodiment 6 toward an image generator, ON/OFF timing of each light source, colors of light passing through a light transmission control wheel, and an image frame.

Next, a projector including a lighting device according to Embodiment 6 of the present invention will be described with reference to FIG. 12. FIG. 12 provides a view illustrating a relationship between the control for emitting the red (R), green (G), and cyan light from the lighting device of Embodiment 6 and the image frame. The height of the band of the first light source (excitation light) 10 illustrated in FIG. 12 presents the light-emitting amount (light-emitting power) of the first light source (excitation light source) 10. Embodiment 6 uses a lighting device similar to that of Embodiment 5 and a projector using the same except that that the lighting time and the light-emitting amount (light-emitting power) of the first light source (excitation light source) 10 are changed. In Embodiment 6, by using such a projector, each color light is emitted by an operation similar to that in Embodiment 5, and a color image is generated. Thus, the detailed description of the similar configurations and operations will be omitted. In the following description, the operation in Condition 3 illustrated in FIG. 12 will be described in Embodiment 6.

[Sequence for Generating Blue Image]

In Condition 3 illustrated in FIG. 12, a blue image (Bn) is displayed on the light modulator 5b of the image generator 5 by the control of the controller 3. In this case, the controller 3 maintains the lighting of the first light source (excitation light source) 10, but the controller 3 sets the light-emitting amount of the first light source (excitation light source) 10 in Condition 3 to be lower than that in Conditions 1, 2. In Condition 3, the controller 3 turns on (ON) the second light source 11. In Condition 3, the blue light from the second light source 11 and the yellow fluorescence (yellow light) from the fluorescent body wheel 14 are simultaneously emitted on the emission optical path Pi through the dichroic mirror 17, and are mixed. The mixed light is incident on the light transmission control wheel 15-4, and the blue light (all of blue light or a part of blue light such as wavelength λa) derived from the second light source 11 and a part of the yellow fluorescence (yellow light) (for example, green light of wavelength λC) pass through the third region 15-4c for transmitting a cyan color, so that the cyan light is generated. The cyan light is emitted toward the light tunnel 4a illustrated in FIG. 1 from the emission light path Pi, and is irradiated onto the light modulator 5*b*. The cyan projection image is thereby generated in Condition 3.

As described above, in the lighting device of Embodiment 6, it is possible to not only turn on the second light source 11 but also turn on the first light source (excitation light source) 10 with the light-emitting amount lower than that of Condition 1 or Condition 2 during Condition 3, so that the blue light and the fluorescence are mixed. The light adjusted to the cyan color is emitted by the light transmission control wheel 15-4. The blue chromaticity coordinate can be finely adjusted, so that the freedom of the color of the blue light can be improved. However, the present invention is not limited to the configuration of Embodiment 6, and the adjustment of the lighting time of the first light source (excitation light source) 11 in Embodiment 5 and the adjustment of the light-emitting amount of the first light source (excitation amount) 10 in Embodiment 6 can be combined.

In Embodiments 5, 6, the cyan light is generated and emitted, so as to generate a cyan projection image. However, the present invention is not limited to the configurations of these embodiments. For example, when generating the yellow light in Embodiment 3 or generating the white light in Embodiment 4, the light-emitting time and the light-emitting amount of the first light source (excitation light source) 10 and the second light source 11 can be changed. With this configuration, the emission light from the two light sources can be mixed, and arbitrary yellow light and white light can be generated. The blue light from the second light source 11 is mixed with the yellow fluorescence generated by turning on the first light source (excitation light source) 10 for the red light and the green light obtained from the yellow fluorescence, and the optical property of the transmission range of the green light and the transmission range of the red light in the light transmission control wheel can be adjusted. The chromaticity coordinate of the red light and the chromaticity coordinate of the green light can be finely adjusted, and the color reproduction range can be also finely adjusted.

As described above, although the embodiments of the present invention have been described above, the present invention is not limited thereto. It should be appreciated that variations may be made in the embodiments described by persons skilled in the art without departing from the scope of the present invention. For example, the numbers, positions, and shapes of the above-described members are not limited to each embodiment, and appropriate number, positions and shapes can be used. In the above embodiments, the examples which are applied to the projector which projects an image on a projection surface such as a screen, and displays an enlarged image are described. The present invention is not limited to the above embodiments. The present invention can be applied to, for example, a projector as an exposure device which exposes a circuit pattern on a wafer in a semiconductor device manufacturing process.

According to the embodiments of the present invention, a lighting device which can emit high color purity light, the projector including the lighting device, and the lighting method can be provided.

What is claimed is:
1. A lighting device, comprising:
   a first light source configured to emit excitation light;
   a wavelength convertor configured to generate fluorescence containing at least a first wavelength range and a second wavelength range by excitation with the excitation light;
   a second light source configured to light containing a third wavelength range different from the first wavelength range and the second wavelength range;
   an optical path-combining element configured to combine an optical path for the fluorescence from the wavelength convertor and an optical path for the light from the second light source, so as to guide the combined optical paths to a single emission optical path; and
   a light separator disposed in the emission optical path, and configured to obtain and emit at least the first wavelength range and the second wavelength range of the fluorescence and at least the third wavelength range of the light from the second light source on a time-division basis, wherein
      the wavelength convertor includes a region configured to generate the fluorescence by irradiation of the excitation light, and all of the region forms a reflection optical path which reflects the fluorescence toward the optical path-combining element,
      the light separator includes a first region configured to transmit at least the light of the first wavelength range and guide the light of the first wavelength range to the emission optical path, a second region configured to transmit at least the light of the second wavelength range and guide the light of the second wavelength range to the emission optical path, and a third region configured to transmit at least the light of the third wavelength range and guide the light of the third wavelength range to the emission optical path,
      the light separator includes a fourth region configured to simultaneously transmit the light of the first wavelength range and the light of the second wavelength range, and the guide the light of the first wavelength range and the second wavelength range to the emission optical path, and
      the first region, the second region, the third region, and the fourth region are sequentially arranged in the emission optical path.

2. The lighting device according to claim 1, wherein
the excitation light from the first light source and the light containing the third wavelength range from the second light source are incident on the optical path-combining element from different directions, and
if the excitation light is within the third wavelength range, the optical path-combining element is configured to reflect or transmit the light of the third wavelength range in the excitation light, and guide the light of the third wavelength range in the excitation light in a direction different from the emission optical path.

3. The lighting device according to claim 1, wherein
the light separator includes a fifth region configured to simultaneously transmit the light of the first wavelength range, the light of the second wavelength range, and the light of the third wavelength range, and guide the light of the first, second, and third wavelength ranges to the emission optical path, and
the first region, the second region, the third region, the fourth region, and the fifth region are sequentially arranged in the emission optical path.

4. The lighting device according to claim 1, wherein
the excitation light source is a laser diode, and the optical path-combining element is configured to reflect the excitation light from the laser diode, and guide the reflected excitation light to the wavelength convertor.

5. A projector, comprising:
the lighting device according to claim 1;
an image generator to which light emitted from the lighting device is irradiated; and
a projection optical system configured to project an image modulated by the image generator.

6. The lighting device according to claim 1, wherein
the first region or the second region is configured to simultaneously transmit the light of the first wavelength range or the light of the second wavelength range and the light of the third wavelength range.

7. The lighting device according to claim 1, wherein
the third region is configured to simultaneously transmit the light of the first wavelength range or the light of the second wavelength range and the light of the third wavelength range.

8. A lighting device, comprising:
a first light source configured to emit excitation light;
a wavelength convertor configured to generate fluorescence containing at least a first wavelength range and a second wavelength range by excitation with the excitation light;
a second light source configured to light containing a third wavelength range different from the first wavelength range and the second wavelength range;
an optical path-combining element configured to combine an optical path for the fluorescence from the wavelength convertor and an optical path for the light from the second light source, so as to guide the combined optical paths to a single emission optical path; and
a light separator disposed in the emission optical path, and configured to obtain and emit at least the first wavelength range and the second wavelength range of the fluorescence and at least the third wavelength range of the light from the second light source on a time-division basis, wherein
the wavelength convertor includes a region configured to generate the fluorescence by irradiation of the excitation light, and all of the region forms a reflection optical path which reflects the fluorescence toward the optical path-combining element,
the light separator includes a first region configured to transmit at least the light of the first wavelength range and guide the light of the first wavelength range to the emission optical path, a second region configured to transmit at least the light of the second wavelength range and guide the light of the second wavelength range to the emission optical path, and a third region configured to transmit at least the light of the third wavelength range and guide the light of the third wavelength range to the emission optical path,
the first region, the second region, and the third region are sequentially arranged in the emission optical path, and
the first region or the second region is configured to simultaneously transmit the light of the first wavelength range or the light of the second wavelength range and the light of the third wavelength range.

9. A lighting device, comprising:
a first light source configured to emit excitation light;
a wavelength convertor configured to generate fluorescence containing at least a first wavelength range and a second wavelength range by excitation with the excitation light;
a second light source configured to light containing a third wavelength range different from the first wavelength range and the second wavelength range;
an optical path-combining element configured to combine an optical path for the fluorescence from the wavelength convertor and an optical path for the light from the second light source, so as to guide the combined optical paths to a single emission optical path; and
a light separator disposed in the emission optical path, and configured to obtain and emit at least the first wavelength range and the second wavelength range of the fluorescence and at least the third wavelength range of the light from the second light source on a time-division basis, wherein
the wavelength convertor includes a region configured to generate the fluorescence by irradiation of the excitation light, and all of the region forms a reflection optical path which reflects the fluorescence toward the optical path-combining element,
the light separator includes a first region configured to transmit at least the light of the first wavelength range and guide the light of the first wavelength range to the emission optical path, a second region configured to transmit at least the light of the second wavelength range and guide the light of the second wavelength range to the emission optical path, and a third region configured to transmit at least the light of the third wavelength range and guide the light of the third wavelength range to the emission optical path,
the first region, the second region, and the third region are sequentially arranged in the emission optical path, and
the third region is configured to simultaneously transmit the light of the first wavelength range or the light of the second wavelength range and the light of the third wavelength range.

10. A lighting method, comprising:
emitting an excitation light by lighting a first light source;
guiding the excitation light to a wavelength convertor, and generating in the wavelength convertor the fluorescence containing at least a first wavelength range and a second wavelength range;
emitting light containing a third wavelength range different from the first wavelength range and the second wavelength range by lighting a second light source;
combining an optical path for the fluorescence and an optical path for the light from the second light source, and guiding the combined optical paths to a single emission optical path;
obtaining and emitting at least the light of the first wavelength range and the second wavelength range of the fluorescence combined with the emission optical path and at least the light of the third wavelength range of the light from the second light source on a time-division basis;
preparing a light separator including a first region configured to transmit at least the light of the first wavelength range and guide the light to the emission optical path, a second region configured to transmit at least the light of the second wavelength range and guide the light to the emission optical path, and a third region configured to transmit at least the light of the third wavelength range and guide the light to the emission optical path; and
sequentially arranging the first region, the second region, and the third region in the emission optical path, wherein
if the first region or the second region is arranged in the emission optical path, the first light source and the second light source are turned on and the light of the first wavelength range or the light of the second wavelength range and the light of the third wavelength range simultaneously pass through the first region or the second region, and if the third region is arranged in the emission optical path, the first light source is turned off and the second light source is turned on.

11. A lighting method, comprising:

emitting an excitation light by lighting a first light source;

guiding the excitation light to a wavelength convertor, and generating in the wavelength convertor the fluorescence containing at least a first wavelength range and a second wavelength range;

emitting light containing a third wavelength range different from the first wavelength range and the second wavelength range by lighting a second light source;

combining an optical path for the fluorescence and an optical path for the light from the second light source, and guiding the combined optical paths to a single emission optical path;

obtaining and emitting at least the light of the first wavelength range and the second wavelength range of the fluorescence combined with the emission optical path and at least the light of the third wavelength range of the light from the second light source on a time-division basis;

preparing a light separator including a first region configured to transmit at least the light of the first wavelength range and guide the light to the emission optical path, a second region configured to transmit at least the light of the second wavelength range and guide the light to the emission optical path, and a third region configured to transmit at least the light of the third wavelength range and guide the light to the emission optical path; and sequentially arranging the first region, the second region, and the third region in the emission optical path, wherein if the first region or the second region is arranged in the emission optical path, the first light source is turned on and the second light source is turned off, and if the third region is arranged in the emission optical path, the second light source is turned on, and the first light source is turned on for at least a predetermined time while the second light source is turned on, and the light of the first wavelength range or the light of the second wavelength range and the light of the third wavelength range simultaneously pass through the third region.

12. A lighting method, comprising:

emitting an excitation light by lighting a first light source;

guiding the excitation light to a wavelength convertor, and generating in the wavelength convertor the fluorescence containing at least a first wavelength range and a second wavelength range;

emitting light containing a third wavelength range different from the first wavelength range and the second wavelength range by lighting a second light source;

combining an optical path for the fluorescence and an optical path for the light from the second light source, and guiding the combined optical paths to a single emission optical path;

obtaining and emitting at least the light of the first wavelength range and the second wavelength range of the fluorescence combined with the emission optical path and at least the light of the third wavelength range of the light from the second light source on a time-division basis;

preparing a light separator including a first region configured to transmit at least the light of the first wavelength range and guide the light to the emission optical path, a second region configured to transmit at least the light of the second wavelength range and guide the light to the emission optical path, and a third region configured to transmit at least the light of the third wavelength range and guide the light to the emission optical path; and sequentially arranging the first region, the second region, and the third region in the emission optical path, wherein if the first region or the second region is arranged in the emission optical path, the first light source is turned on and the second light source is turned off, if the third region is arranged in the emission optical path, the second light source is turned on and the first light source is turned on with a light-emitting amount smaller than a light-emitting amount of the first light source when the first region or the second region is arranged, and the light of the first wavelength range or the light of the second wavelength range and the light of the third wavelength range simultaneously pass through the third region.

13. A lighting method, comprising:

emitting an excitation light by lighting a first light source;

guiding the excitation light to a wavelength convertor, and generating in the wavelength convertor the fluorescence containing at least a first wavelength range and a second wavelength range;

emitting light containing a third wavelength range different from the first wavelength range and the second wavelength range by lighting a second light source;

combining an optical path for the fluorescence and an optical path for the light from the second light source, and guiding the combined optical paths to a single emission optical path;

obtaining and emitting at least the light of the first wavelength range and the second wavelength range of the fluorescence combined with the emission optical path and at least the light of the third wavelength range of the light from the second light source on a time-division basis;

preparing a light separator including a first region configured to transmit at least the light of the first wavelength range and guide the light to the emission optical path, a second region configured to transmit at least the light of the second wavelength range and guide the light to the emission optical path, and a third region configured to transmit at least the light of the third wavelength range and guide the light to the emission optical path; and sequentially arranging the first region, the second region, and the third region in the emission optical path, wherein the light separator includes a fourth region configured to transmit at least the light of the first wavelength range and the light of the second wavelength range, and if the fourth region is arranged in the emission optical path, the first light source is turned on and the second light source is turned off.

14. The lighting method according to claim 13, wherein the light separator includes a fifth region configured to simultaneously transmit the light of the first wavelength range, the light of the second wavelength range, and the light of the third wavelength range, and guide the light of the first, second and third wavelength ranges to the emission optical path, and if the fifth region is arranged in the emission optical path, the first light source and the second light source are turned on.

* * * * *